(12) United States Patent
Davis

(10) Patent No.: US 7,147,412 B2
(45) Date of Patent: Dec. 12, 2006

(54) DOWELING JIG FOR WOODWORKING

(76) Inventor: Robert L. Davis, 312 N. Calle Cesar Chavez, Santa Barbara, CA (US) 93103

( * ) Notice: Subject to any disclaimer, the term of this patent is extended or adjusted under 35 U.S.C. 154(b) by 309 days.

(21) Appl. No.: 10/458,214

(22) Filed: Jun. 10, 2003

(65) Prior Publication Data
US 2004/0253065 A1    Dec. 16, 2004

(51) Int. Cl.
*B23B 47/28*    (2006.01)
(52) U.S. Cl. ............... 408/115 R; 408/103; 269/87.3; 269/156; 269/242; 269/252; 269/258
(58) Field of Classification Search ............... 408/97, 408/103, 115 R, 241 B; 294/119.1; 269/87.3, 269/156, 242, 252, 258
See application file for complete search history.

(56) References Cited

U.S. PATENT DOCUMENTS

| | | | | |
|---|---|---|---|---|
| 1,075,384 | A | * | 10/1913 | Seidel ..................... 269/156 |
| 1,682,150 | A | * | 8/1928 | Sklarek ..................... 408/85 |
| 1,709,385 | A | * | 4/1929 | Young ..................... 269/156 |
| 2,470,038 | A | * | 5/1949 | Long ..................... 408/109 |
| 2,602,238 | A | * | 7/1952 | Wellman ............... 408/241 G |
| 2,662,433 | A | * | 12/1953 | Braun ..................... 269/153 |
| 2,939,197 | A | * | 6/1960 | Leven ..................... 279/112 |
| 3,062,076 | A | * | 11/1962 | Craig ..................... 408/105 |
| 3,302,674 | A | * | 2/1967 | Russell et al. .......... 408/241 G |
| 3,575,405 | A | * | 4/1971 | Harding ..................... 269/258 |
| 3,708,237 | A | | 1/1973 | Kruse |
| 3,874,086 | A | | 4/1975 | Ludlam |
| 4,052,046 | A | * | 10/1977 | Mortoly ..................... 269/208 |
| 4,057,358 | A | | 11/1977 | Young |
| 4,093,394 | A | | 6/1978 | Adams |
| 4,145,160 | A | | 3/1979 | Wiggins |
| 4,153,384 | A | * | 5/1979 | Isaken ..................... 408/115 R |
| 4,199,283 | A | * | 4/1980 | Perry ..................... 408/115 R |
| 4,294,567 | A | | 10/1981 | Wiggins |
| 4,332,514 | A | | 6/1982 | Dergo |
| 4,377,357 | A | | 3/1983 | Butera |
| 4,394,800 | A | | 7/1983 | Griset |
| 4,421,442 | A | | 12/1983 | Lindblad |
| 4,443,138 | A | | 4/1984 | Butera |
| 4,449,867 | A | | 5/1984 | Dergo |
| 4,490,920 | A | | 1/1985 | Griset |
| D282,237 | S | | 1/1986 | Warburg |
| 4,594,032 | A | | 6/1986 | Warburg |

(Continued)

FOREIGN PATENT DOCUMENTS

GB        1399098 A  *  6/1975

(Continued)

OTHER PUBLICATIONS

Bessey Variable Angle Clamp Device (1 page).

(Continued)

*Primary Examiner*—Monica Carter
*Assistant Examiner*—Michael W. Talbot
(74) *Attorney, Agent, or Firm*—Knobbe, Martens, Olson & Bear, LLP

(57) ABSTRACT

The invention relates generally to clamping devices and mechanisms which provide versatile and/or accurate coupling between the communicating members. Some embodiments relate to the field of woodworking and a doweling jig therefor having a hinged jaw mechanism to provide improved clamping between the doweling jig and a workpiece. Some embodiments relate to a connection or attachment device having a hinged jaw mechanism for detachably attaching a body portion to a structure or support element. Advantageously, the hinged jaw mechanism compensates for angular variations and irregularity in shape of the workpiece, structure or support. The hinged jaw mechanism desirably provides load bearing substantially over its entire length span.

5 Claims, 15 Drawing Sheets

U.S. PATENT DOCUMENTS

| | | | | |
|---|---|---|---|---|
| 4,619,447 A | * | 10/1986 | Blake | 269/221 |
| 4,747,588 A | * | 5/1988 | Dillhoff | 269/6 |
| 4,850,630 A | * | 7/1989 | Davies | 294/103.1 |
| 4,865,496 A | * | 9/1989 | Challis | 408/115 R |
| 4,884,926 A | * | 12/1989 | Gibson | 408/115 R |
| 4,923,340 A | | 5/1990 | Hegedusch | |
| 4,928,939 A | | 5/1990 | Bell et al. | |
| 5,024,564 A | | 6/1991 | Lloyd | |
| 5,154,548 A | | 10/1992 | Walsh | |
| 5,238,336 A | | 8/1993 | Sanders et al. | |
| 5,299,896 A | * | 4/1994 | Ferri | 408/72 R |
| 5,312,097 A | * | 5/1994 | Womack | 269/139 |
| 5,312,409 A | * | 5/1994 | McLaughlin et al. | 606/86 |
| 5,407,307 A | | 4/1995 | Park | |
| 5,409,329 A | * | 4/1995 | Juang | 408/115 R |
| 5,466,098 A | * | 11/1995 | Juang | 408/115 R |
| 5,560,174 A | | 10/1996 | Goto | |
| D380,953 S | | 7/1997 | Norgaard | |
| 5,676,500 A | * | 10/1997 | Sommerfeld | 408/103 |
| 5,775,856 A | * | 7/1998 | Woodard | 408/103 |
| 5,782,006 A | | 7/1998 | Erway et al. | |
| 5,860,197 A | * | 1/1999 | Fox | 24/522 |
| 5,992,837 A | * | 11/1999 | Groves | 269/258 |
| 6,029,964 A | * | 2/2000 | Bohl | 269/6 |
| 6,135,435 A | * | 10/2000 | Schmitz | 269/164 |
| 6,244,794 B1 | | 6/2001 | Lindsay | |
| 6,244,795 B1 | | 6/2001 | Fenelon | |
| 6,283,685 B1 | * | 9/2001 | Lemieux | 408/115 R |
| 6,659,695 B1 | * | 12/2003 | Park | 408/103 |
| 2001/0036389 A1 | | 11/2001 | Park | |
| 2002/0109282 A1 | * | 8/2002 | Peck | 269/258 |

FOREIGN PATENT DOCUMENTS

| | | | |
|---|---|---|---|
| GB | 2257644 A | * | 1/1993 |
| GB | 2397259 A | * | 7/2004 |

OTHER PUBLICATIONS

Round Handle Style Device (1 page).
Wilton Woodworking Vise (1 page).

* cited by examiner

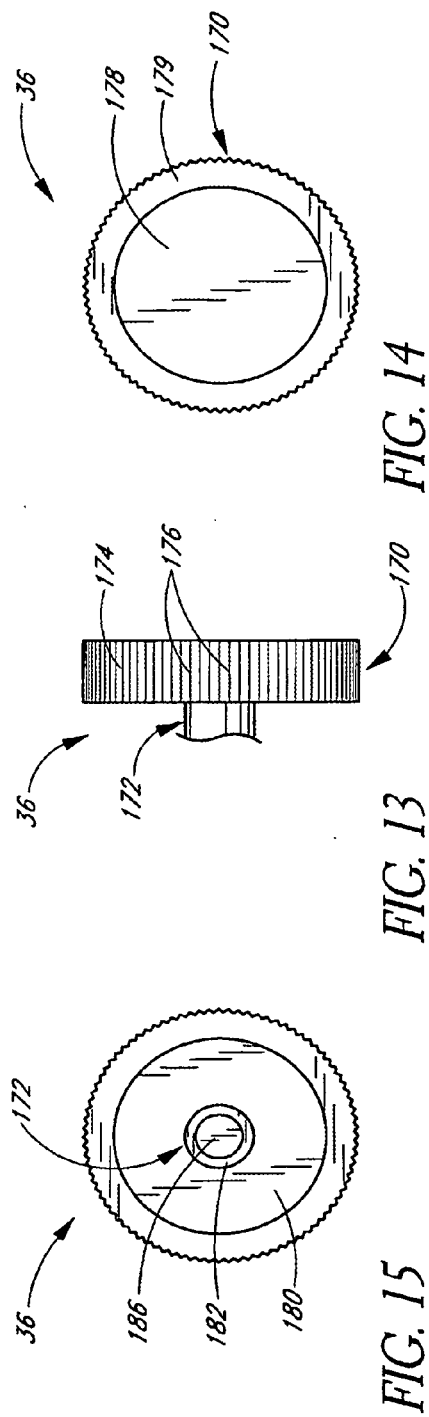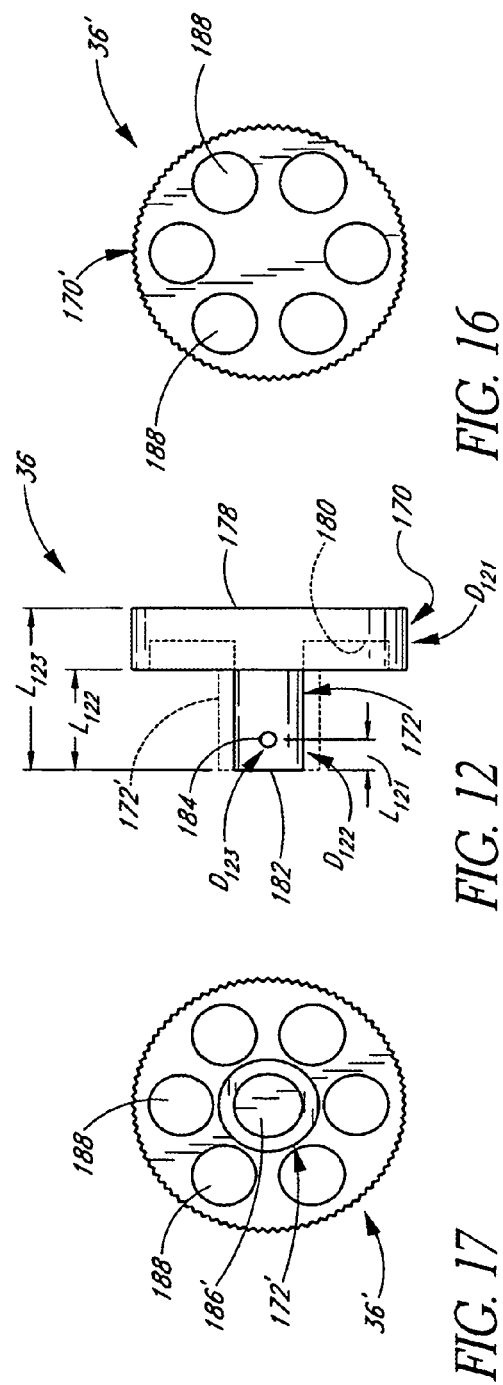

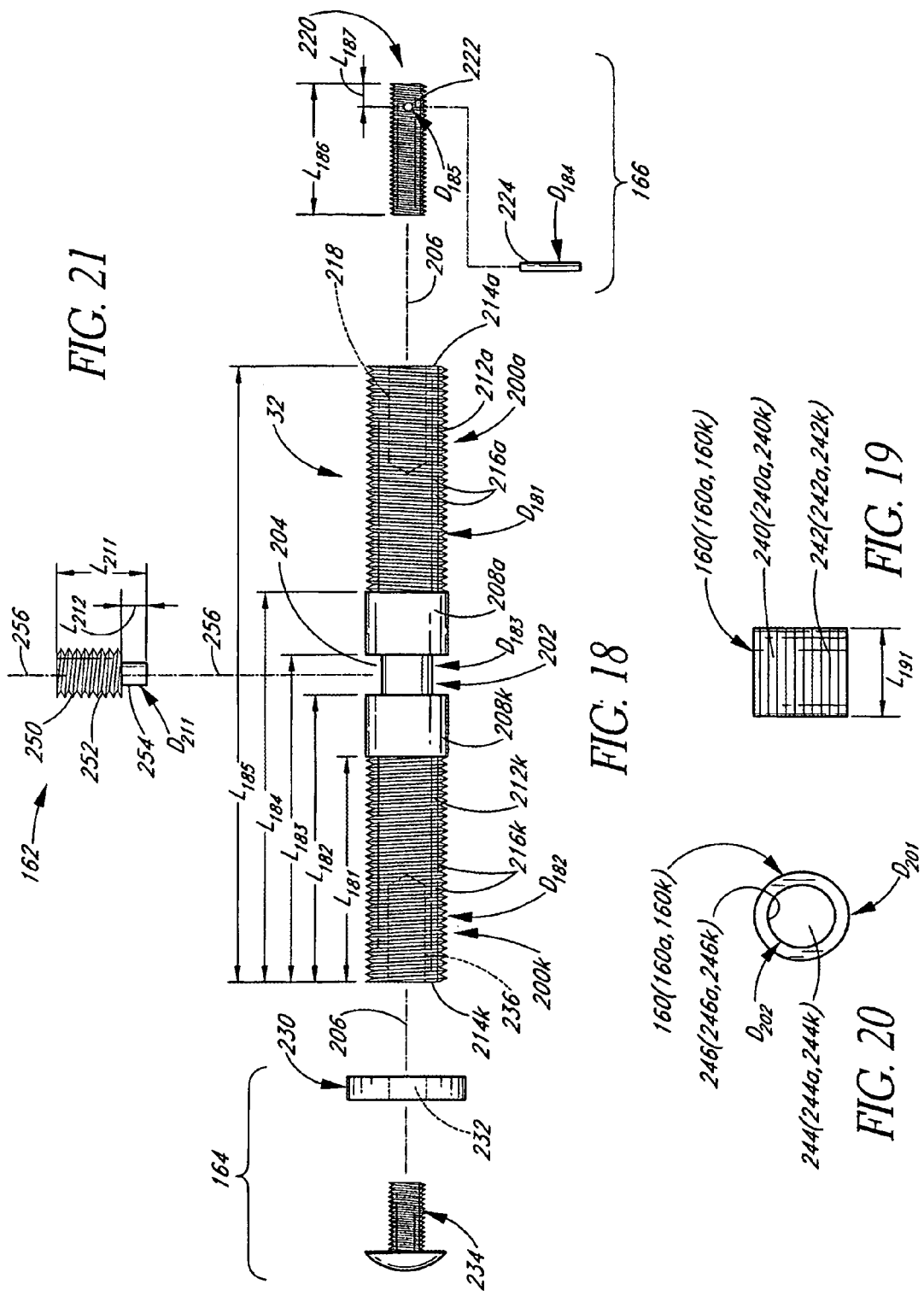

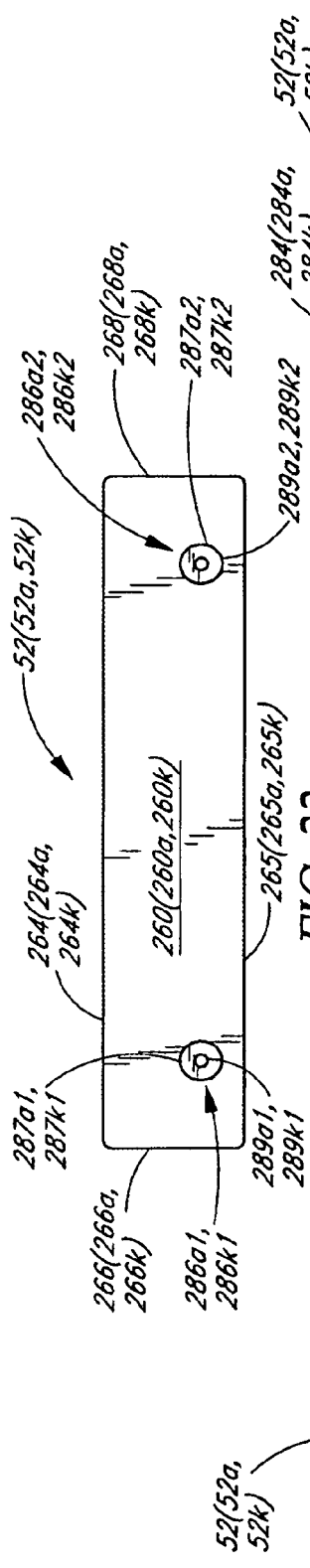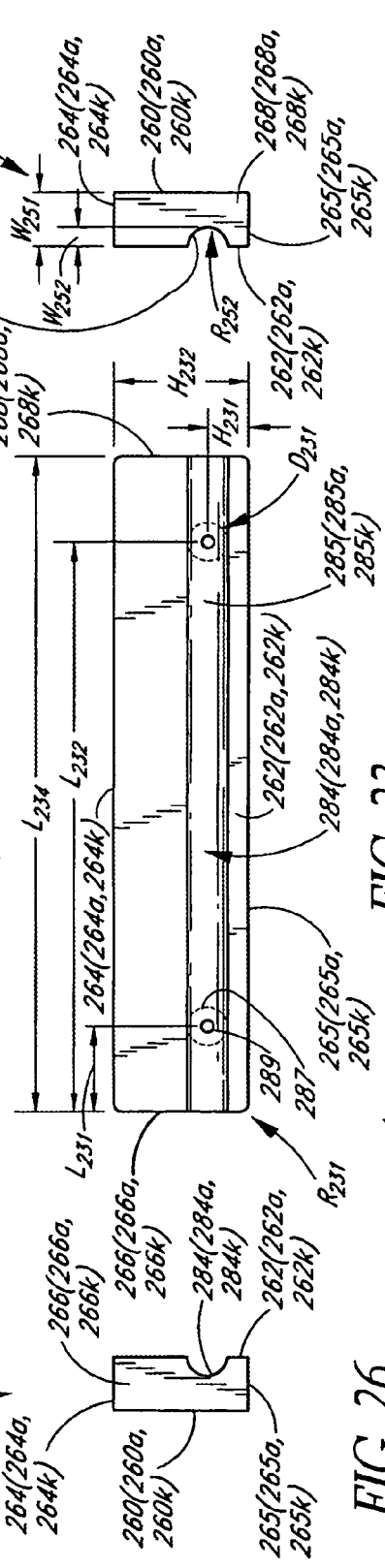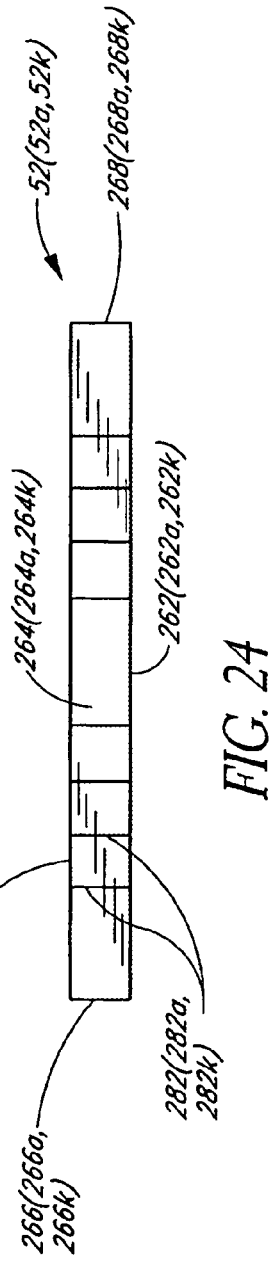

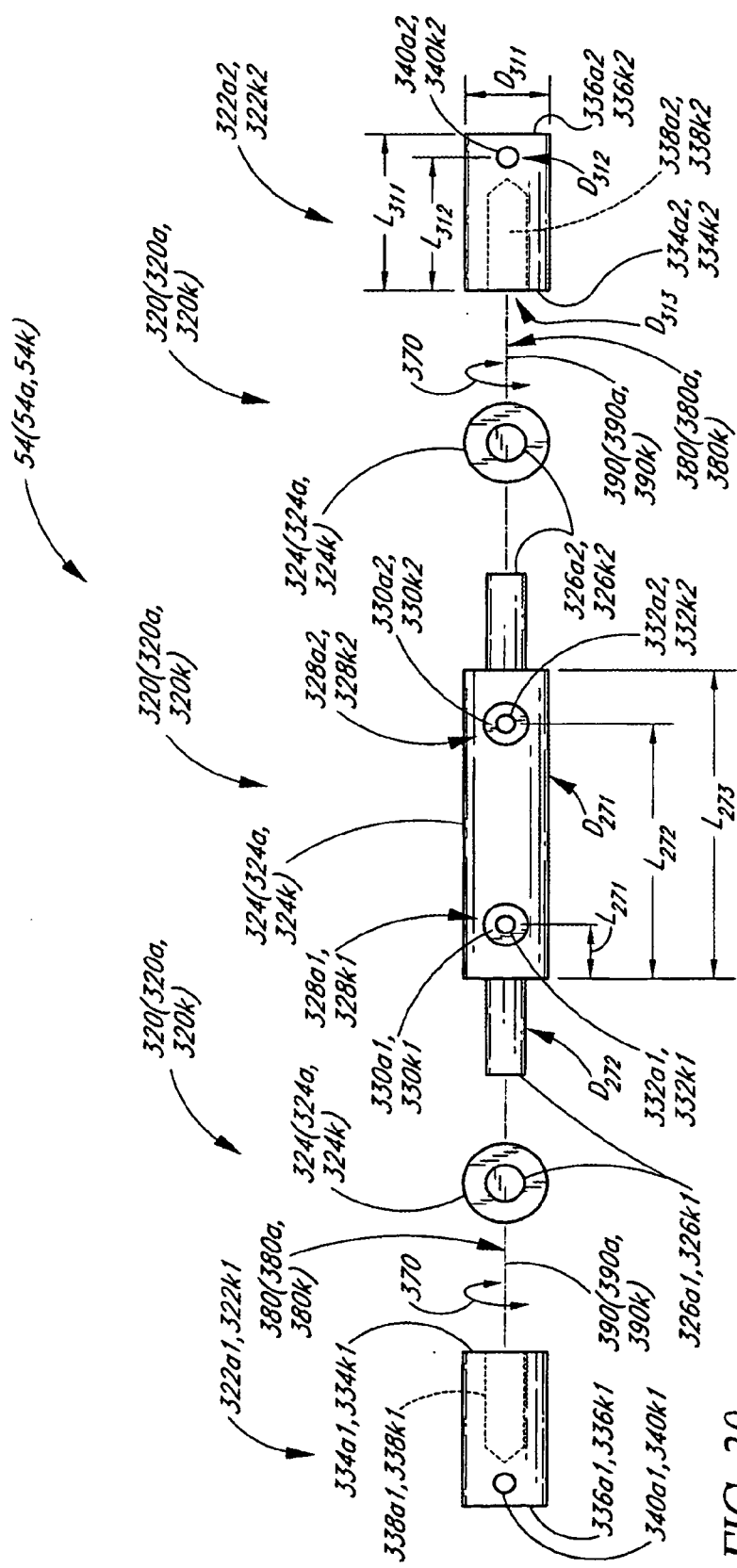

DOWELING JIG FOR WOODWORKING

BACKGROUND OF THE INVENTION

1. Field of the Invention

The invention relates generally to clamping devices and mechanisms which provide versatile and accurate coupling between the communicating members More particularly, the invention relates to the field of woodworking and a doweling jig therefor having a hinged jaw mechanism to provide improved clamping between the doweling jig and a workpiece.

2. Description of the Related Art

Doweling jigs are used to facilitate the generation of drilled holes for receiving dowels in wood workpieces. The doweling jig is connected to the workpiece and holes are drilled in the workpiece. The workpieces are then joined in subsequent assembly operations.

Conventional doweling jigs suffer from various drawbacks. Disadvantageously, they can be difficult to manipulate and are limited in their precision. In addition, and undesirably, many conventional doweling jigs do not have sufficient structural strength and are not durable.

The connection between conventional doweling jigs and the workpiece can result in skewed clamping. Disadvantageously, this causes inaccuracies in the positioning and orientation of the drilled dowel receiving holes which, in turn, not only complicates, and in some cases may prohibit unless remedied, the assembly of the workpieces but can also produce an end-product of undesirable quality.

SUMMARY OF THE INVENTION

The invention relates generally to clamping devices and mechanisms which provide versatile and/or accurate coupling between the communicating members. Some embodiments relate to the field of woodworking and a doweling jig therefor having a hinged jaw mechanism to provide improved clamping between the doweling jig and a workpiece. Some embodiments relate to a connection or attachment device having a hinged jaw mechanism for detachably attaching a body portion to a structure or support element.

In some embodiments, the hinged jaw mechanism comprises a pair of pivotable jaws operatively connected to a pair of corresponding hinge assemblies. Advantageously, the pivoting jaws or clamping members compensate for angular variations and irregularity in shape of the workpiece, structure or support. Thus, the generation of an undesirable cantilever force due to skewed contact is substantially prevented or mitigated and secure attachment and/or desired orientation is achieved. The hinged assemblies provide load bearing substantially over their entire length span, thereby desirably providing enhanced clamping.

In accordance with one embodiment, a doweling jig for woodworking is provided. The doweling jig generally comprises a main body portion, a bushing member, a first clamping surface, a second clamping surface, a first pivot mechanism and a second pivot mechanism. The main body portion comprises a first jaw and a second jaw. The first jaw and the second jaw are spaced from one another to form a gap therebetween. The first jaw has a first length and the second jaw has a second length. The bushing member is between the first jaw and the second jaw. The bushing member comprises a plurality of through holes sized and configured to receive drill bits of varying size. The first clamping surface extends substantially along the first length of the first jaw and is connected to the first jaw. The first clamping surface is substantially flat. The second clamping surface extends substantially along the second length of the second jaw and is connected to the second jaw. The second clamping surface is substantially flat. The first pivot mechanism is operatively coupled to the first jaw and the first clamping surface to permit rotation of the first clamping surface relative to the first jaw. The second pivot mechanism is operatively coupled to the second jaw and the second clamping surface to permit rotation of the second clamping surface relative to the second jaw. At least one of the clamping surfaces is movable towards and away from the other clamping surface to securely clamp a workpiece between the clamping surfaces and align the bushing member relative to the workpiece.

In accordance with another embodiment, a doweling jig for woodworking is provided. The doweling jig generally comprises a first jaw, a second jaw, a bushing plate and a shaft assembly. The first jaw has a substantially flat first clamping surface to engage a first surface of a workpiece. The first jaw is pivotable about a first rotation axis of the doweling jig to allow the first clamping surface to compensate for angular variations of the first surface of the workpiece. The second jaw has a substantially flat second clamping surface to engage a second surface of the workpiece. The first jaw and the second jaw are spaced to form a gap therebetween. The bushing plate is mounted above and substantially centrally relative to the first jaw and the second jaw. The bushing plate has an upper surface, a lower surface and a plurality of holes extending therethrough for receiving drill bits of varying size. The lower surface is substantially flat and adapted to abut against a top surface of the workpiece. The shaft assembly is operatively coupled with the bushing plate, the first jaw and the second jaw for moving the first jaw and the second jaw to vary the gap between the first jaw and the second jaw while maintaining the bushing plate in a fixed position that is substantially centered relative to the first jaw and the second jaw.

Yet another embodiment provides a method of aligning a woodworking doweling jig relative to a workpiece for drilling dowel-receiving holes in the workpiece. The method comprises the step of placing the doweling jig on the workpiece so that a bushing member with at least one drill bit receiving passage abuts against a surface of the workpiece in which a hole is to be drilled. The passage is aligned with a predetermined position on the surface of the workpiece at which the hole is to be drilled. The shaft assembly is operated to cause a pair of spaced and pivotable jaws of the doweling jig to move towards a respective one of two generally opposed surfaces of the workpiece to securely clamp the workpiece between the jaws with the jaws pivoting to compensate for any angular variations of the two generally opposed surfaces.

In accordance with a further embodiment, an attachment device for connecting a main body portion to a structure is provided. The attachment device generally comprises a first jaw, a second jaw, a first hinge system and a second hinge system. The first jaw has a first length, a substantially flat first front gripping surface and a first rear surface opposed to the first front gripping surface. The first rear surface has a longitudinal first groove extending substantially entirely along the first length. The second jaw has a second length, a substantially flat second front gripping surface and a second rear surface opposed to the second front gripping surface. The second rear surface has a longitudinal second groove extending substantially entirely along the second length. The first jaw and the second jaw are movable towards and away from one another. The first hinge system is operatively coupled to the first jaw and the main body portion to allow for pivoting of the first jaw. The first hinge system is positioned in said first groove and extends substantially entirely along the first length. The first hinge system comprises a first axle rotatably coupled to a pair of first side bullets. The second hinge system is operatively coupled to the second jaw and the main body portion to allow for pivoting of the second jaw. The second hinge system is positioned in the second groove and extends substantially entirely along the second length. The second hinge system comprises a second axle rotatably coupled to a pair of second side bullets. Advantageously, the jaws provide load bearing capability along substantially entirely the first and second lengths and can clamp to the structure to compensate for angular variations and irregularity in shape.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIG. 12 is a simplified side view of a knob of the doweling jig of FIG. 1 having features and advantages in accordance with one embodiment of the invention.

FIG. 13 is a simplified partial side view illustrating the knurl feature of the knob of FIG. 12.

FIG. 14 is a simplified front end view of the knob of FIG. 12.

FIG. 15 is a simplified rear end view of the knob of FIG. 12.

FIG. 16 is a simplified front end view of the knob of FIG. 12 in accordance with another embodiment.

FIG. 17 is a simplified rear end view of the knob of FIG. 12 in accordance with another embodiment.

FIG. 18 is a simplified side view of a screw shaft assembly of the doweling jig of FIG. 1 having features and advantages in accordance with one embodiment of the invention.

FIG. 19 is a simplified side view of inserts of the screw shaft assembly of FIG. 18.

FIG. 20 is a simplified top view of the inserts of FIG. 19.

FIG. 21 is a simplified side view of a locator stop bolt of the screw shaft assembly of FIG. 18.

FIG. 22 is a simplified front view of pivotable clamping members of the doweling jig of FIG. 1 having features and advantages in accordance with one embodiment of the invention.

FIG. 23 is a simplified rear view of the pivotable clamping members of FIG. 22.

FIG. 24 is a simplified top view of the pivotable clamping members of FIG. 22.

FIGS. 25 and 26 are simplified end views of the pivotable clamping members of FIG. 22.

FIG. 27 is a simplified side view of hinge mechanism axles of the doweling jig of FIG. 1 having features and advantages in accordance with one embodiment of the invention.

FIGS. 28 and 29 are end views of the axles of FIG. 27.

FIGS. 30 and 31 are simplified side views of hinge mechanism bullets of the doweling jig of FIG. 1 having features and advantages in accordance with one embodiment of the invention.

DETAILED DESCRIPTION OF THE PREFERRED EMBODIMENTS

The preferred embodiments of the invention described herein relate generally to clamping devices to provide improved and accurate performance and, in some embodiments, to a woodworking doweling jig having a hinged jaw mechanism to provide versatile functioning.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

The doweling jig of embodiments of the invention has several advantages and desirable features. The unique construction of the doweling jig allows increased leverage and substantially eliminates or mitigates the cantilever force problem, as discussed further below, that is frequently encountered in the field.

Another advantage is that the doweling jig has an ergonomic and user-friendly design which facilitates its operation. Yet another advantage is the accurate alignment relative to the workpiece permitted by the visual differentiation mechanism of the jig.

The doweling jig of embodiments of the invention provides enhanced versatility. Advantageously, the doweling jig can accommodate a wide range of workpiece thicknesses and a large variety of types and sizes of drill bits.

Another advantage of the doweling jig of embodiments of the invention is that it provides enhanced accuracy in the positioning and orientation of the dowel receiving holes that are created by using the jig. Yet another advantage is that the materials and construction of the doweling jig provide a durable tool with enhanced utility.

The unique hinged jaw mechanism of embodiments of the invention provides flush alignment between a workpiece (or object to be clamped or connected to) and the tilting jaws. This has application and utility in a number of configurations, thereby desirably allowing connection of a main body portion to a structure, support member or the like using the hinged jaw mechanism.

Figure 1:
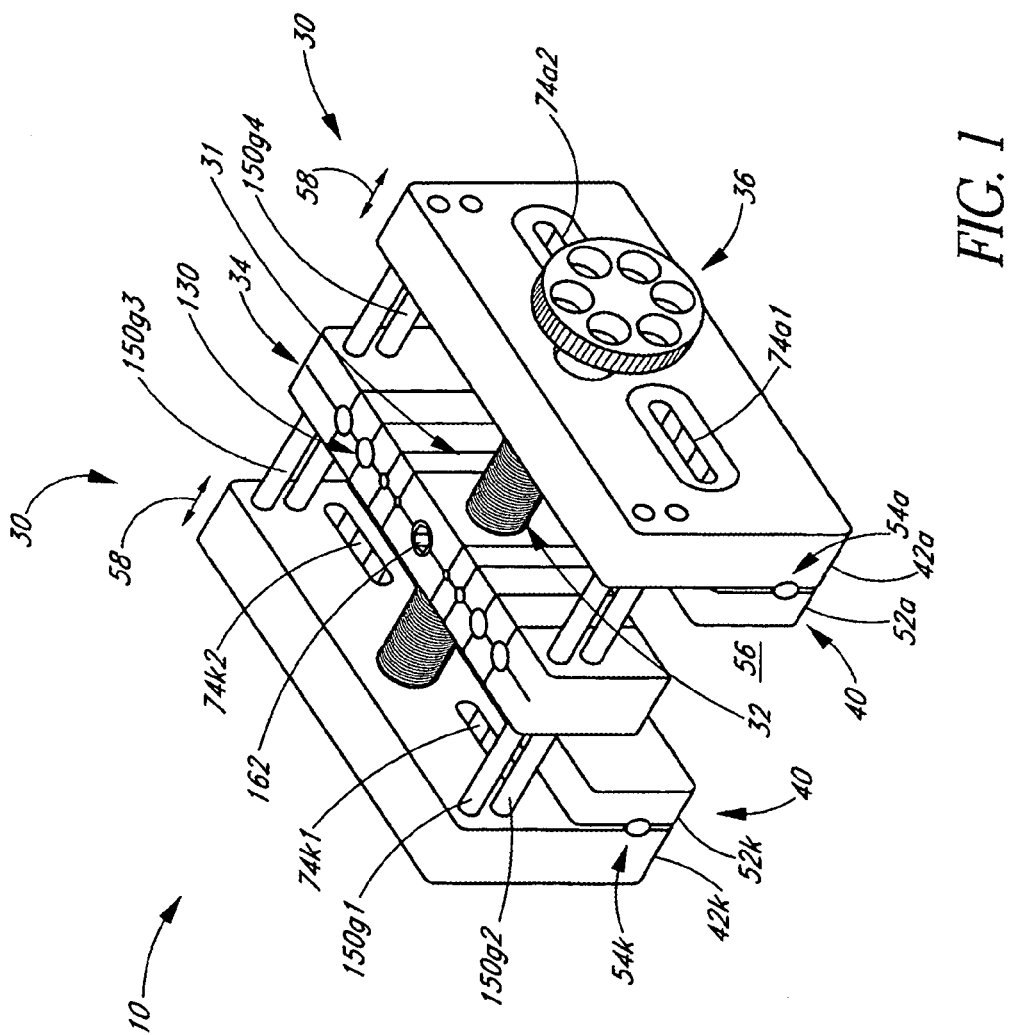
FIG. 1 is a simplified perspective view of a doweling jig in an open position having features and advantages in accordance with one embodiment of the invention.
Figure 2:
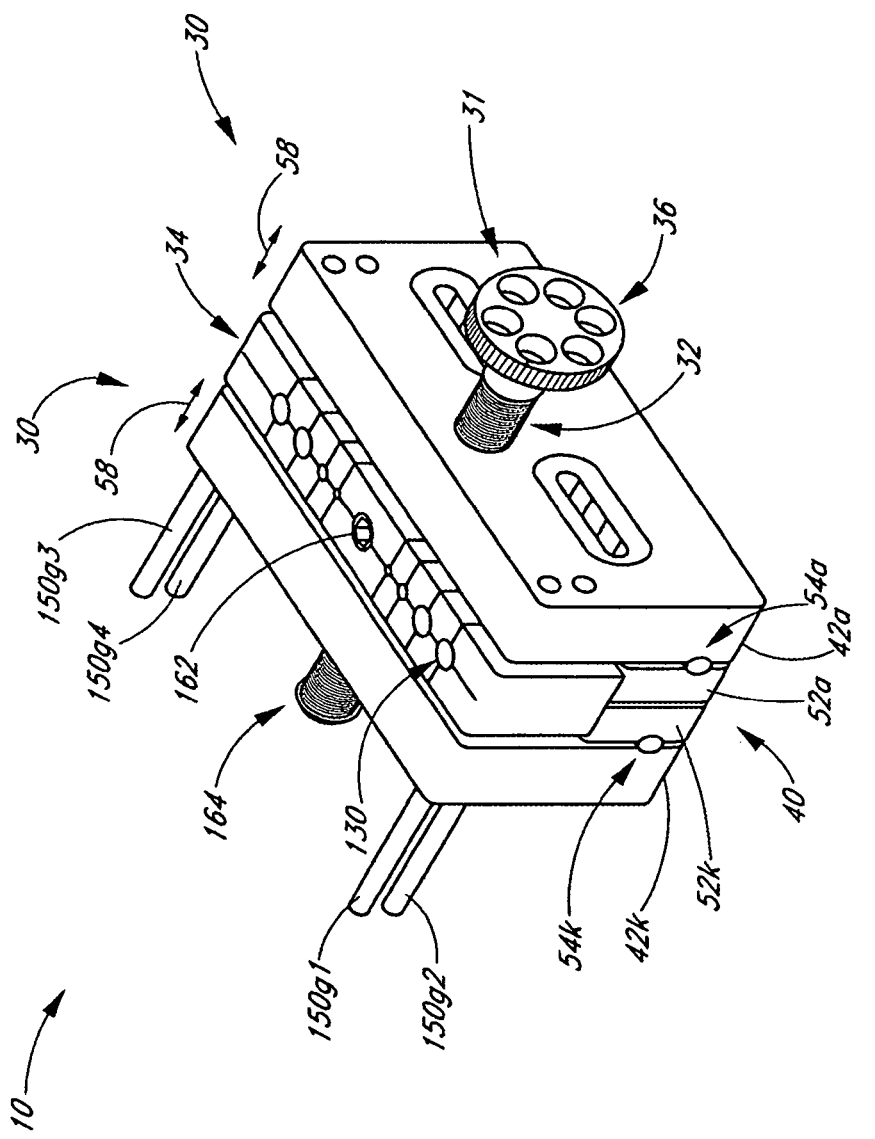
FIG. 2 is a simplified perspective view of the doweling jig of FIG. 1 in a closed position.
Figure 3:
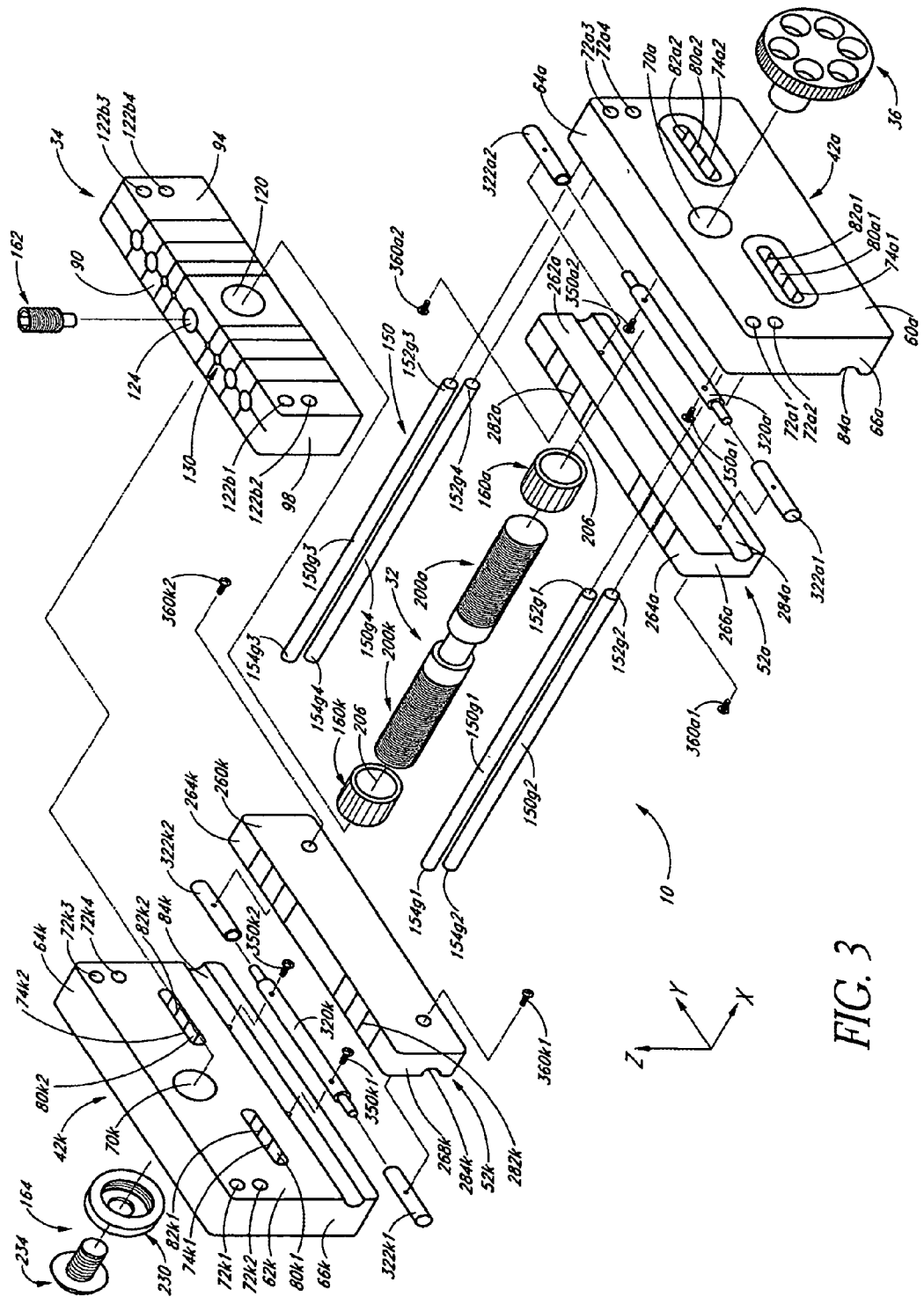
FIG. 3 is a simplified exploded perspective view of the doweling jig of FIG. 1.
Figure 4:
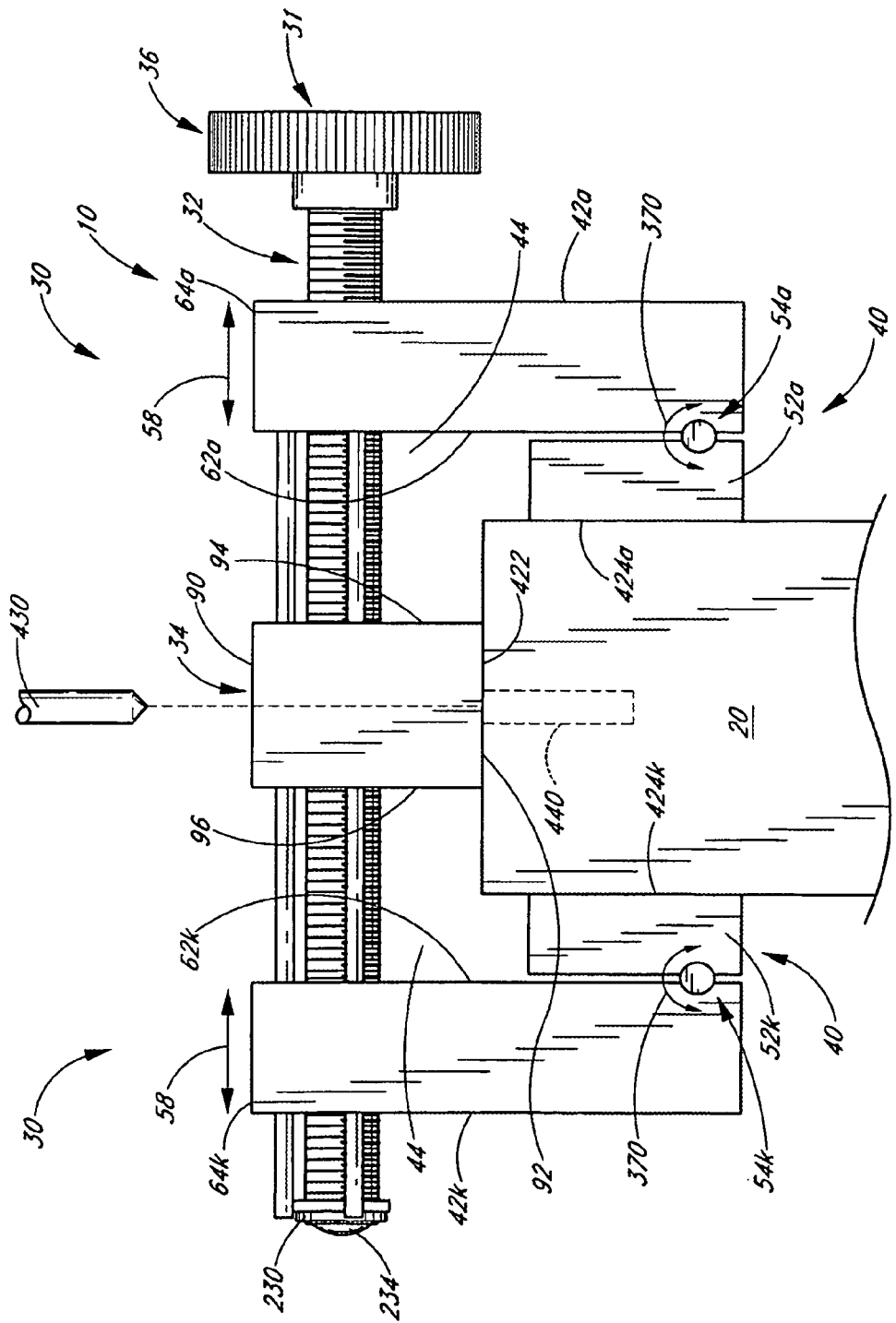
FIG. 4 is a simplified end view of the doweling jig of FIG. 1 illustrating attachment to a workpiece.

FIGS. 1–4 show different views of a doweling jig, fixture, clamp or template 10 in accordance with one embodiment. FIG. 4 illustrates the doweling jig 10 clamped to a workpiece 20.

In the illustrated embodiment of FIGS. 1–4, the doweling jig 10 generally comprises a main body portion 30 threadably mounted and movable on a shaft assembly 31 including a screw shaft 32 and a knob 36 for user operation, a central bushing plate 34 and a hinged jaw system or mechanism 40 for clamping the workpiece 20 therebetween. The main body portion 30 comprises a pair of spaced jaws 42a, 42k with a variable gap 44 (see FIG. 4) and the bushing plate 34 therebetween.

Referring to FIGS. 1–4, the hinged jaw mechanism 40 includes two tilting jaws 52a, 52k coupled to a respective one of the main jaws 42a, 42k by a respective one of hinge or pivot pin mechanisms or assemblies 54a, 54k. The hinged jaws 52a, 52k are movable along with the main jaws 42a, 42k and are spaced by a variable gap 56 (see FIG. 1) within which the workpiece 20 (see FIG. 4) is secured. The main jaws 42a, 42k and the hinged jaws 52a, 52k are movable in directions generally indicated by arrows 58.

Main Body Portion

FIGS. 5–8 show different views of the jaws 42a, 42k indicated by the common or like reference numeral 42. Since the jaws 42a, 42k are preferably similar in most features, except as discussed below, this reference numeral scheme is used to denote like parts in connection with the jaws 42 and also other components discussed below.

In the illustrated embodiment of FIGS. 1–8, the main jaws 42a, 42k are substantially rectangular in shape and preferably have rounded exterior corners and edges. In modified embodiments, the main jaws may be shaped in other suitable manners with efficacy, as needed or desired.

Referring in particular to FIGS. 3 and 5–8, the jaws 42a, 42k have a respective outer surface or face 60a, 60k, a respective inner surface or face 62a, 62k, a respective top or upper surface or face 64a, 64k, a respective bottom or lower surface or face 65a, 65k, and respective pairs of end surfaces or faces 66a, 68a and 66k, 68k. In the illustrated embodiment, the inner surfaces 62a, 62k are generally flat and extend substantially parallel to one another.

Figure 5:
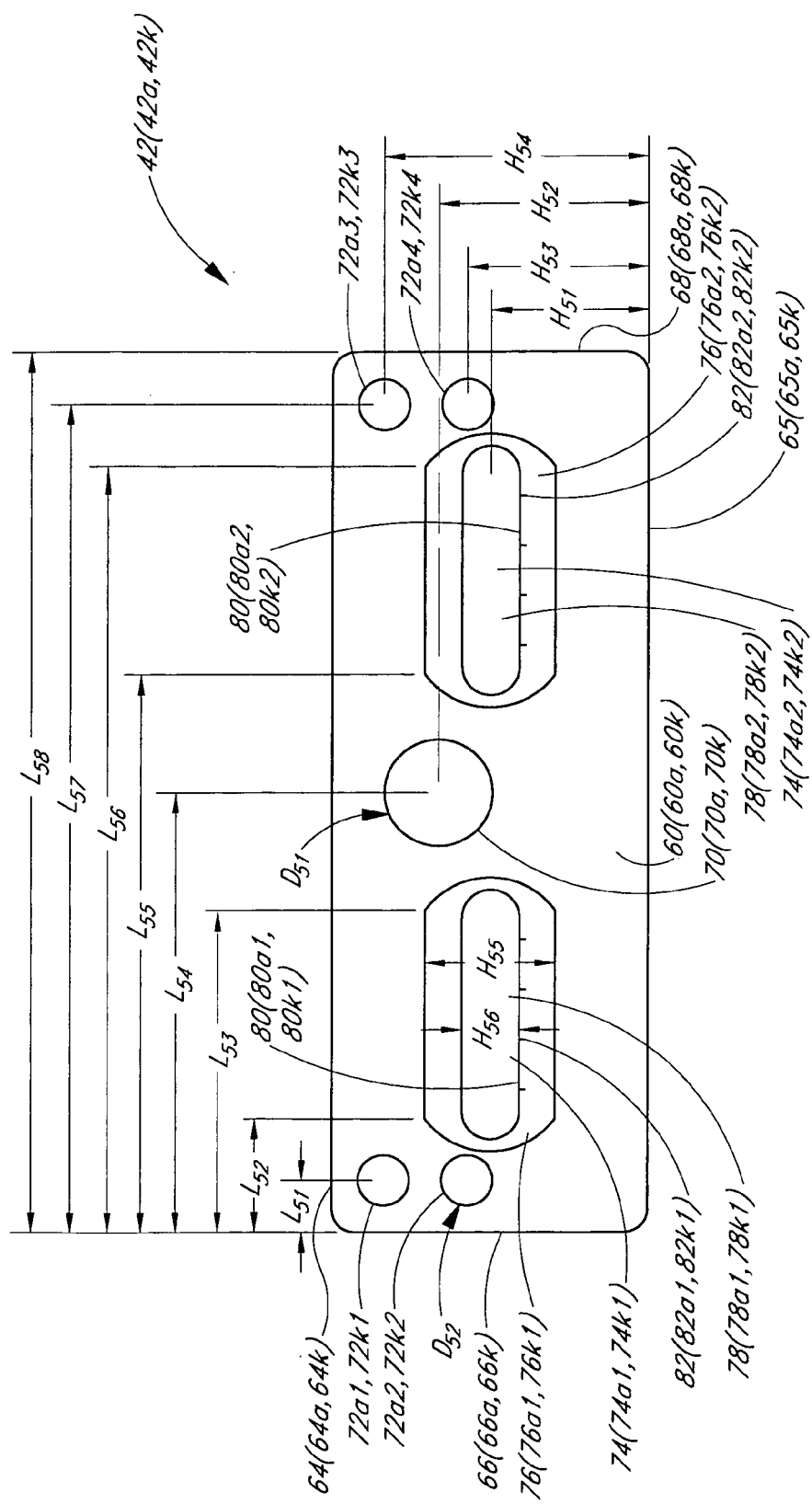
FIG. 5 is a simplified front view of main jaws of the doweling jig of FIG. 1 having features and advantages in accordance with one embodiment of the invention.
Figures 6, 8:
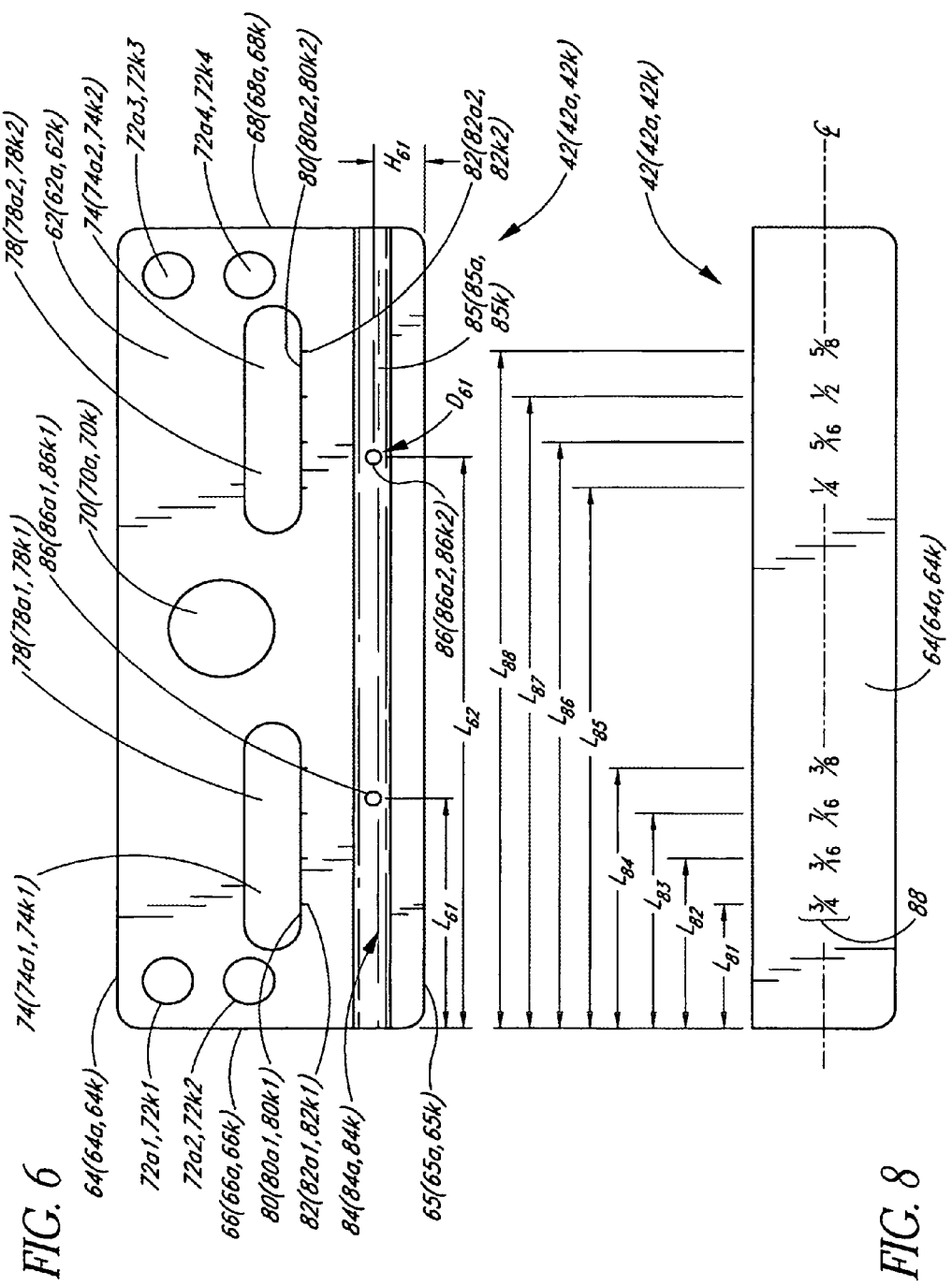
FIG. 6 is a simplified rear view of the jaws of FIG. 5.
FIG. 8 is a simplified top view of the jaws of FIG. 5.

Referring to the drawings, and in particular to FIGS. 3, 5 and 6, the main jaws 42a, 42k each have a substantially round through hole or passage 70a, 70k extending through respective surface pairs 60a, 62a and 60k, 62k. The holes 70a, 70k receive the shaft assembly 31, as discussed further below. The holes 70a, 70k are substantially aligned with one another. The holes 70a, 70k are located at generally half-way between respective side surface pairs 66a, 68a and 66a, 68a and are closer to respective top surfaces 64a, 64k than bottom surfaces 65a, 65k.

Referring in particular to FIGS. 3, 5 and 6, the first main jaw 42a has two pairs of substantially round through holes or passages 72a1, 72a2 and 72a3, 72a4 and the second main jaw 42a has two pairs of substantially round through holes or passages 72k1, 72k2 and 72k3, 72k4. The holes 72 receive the guide pins 74, as discussed further below.

Still referring in particular to FIGS. 3, 5 and 6, the holes 72a1, 72a2, 72a3, 72a4 extend through the surfaces 60a, 62a and the holes 72k1, 72k2, 72k3, 72k4 extend through the surfaces 60k, 62k. The holes 72a1, 72a2, 72a3, 72a4 are substantially aligned with a respective one of the holes 72k1, 72k2, 72k3, 72k4.

Still referring in particular to FIGS. 3, 5 and 6, the pair of holes 72a1, 72a2 are proximate the side surface 66a and the top surface 64a, and are substantially vertically aligned with one another with the hole 72a1 being above the hole 72a2. The pair of holes 72a3, 72a4 are proximate the side surface 68a and the top surface 64a, and are substantially vertically aligned with one another with the hole 72a3 being above the hole 72a4.

As best seen in FIG. 5, the holes 72a1 and 72a3 are substantially horizontally aligned with one another. The holes 72a2, 72a4 are substantially horizontally aligned with one another and with the shaft receiving hole 70a.

Referring in particular to FIGS. 3, 5 and 6, the pair of holes 72k1, 72k2 are proximate the side surface 66k and the top surface 64k, and are substantially vertically aligned with one another with the hole 72k1 being above the hole 72k2. The pair of holes 72k3, 72k4 are proximate the side surface 68k and the top surface 64k, and are substantially vertically aligned with one another with the hole 72k3 being above the hole 72k4.

As best seen in FIG. 5, the holes 72k1 and 72k3 are substantially horizontally aligned with one another. The holes 72k2, 72k4 are substantially horizontally aligned with one another and with the shaft receiving hole 70k.

Referring to the drawings, and in particular FIGS. 1, 3, 5 and 6, the jaw 42a has two through passages or windows 74a1, 74a2 and the jaw 42k has two through passages or windows 74k1, 74k2. Advantageously, and as discussed further below, the holes 74a1, 74a2 and 74k1, 74k2 provide portals to view visual marks or indicia which facilitates in aligning the doweling jig 10 on the workpiece 20. Also, desirably, these passages result in a reduction in the overall weight of the device without sacrificing durability.

Still referring in particular to FIGS. 1, 3, 5 and 6, the passages 74a1, 74a2 extend through the surfaces 60a, 62a and the passages 74k1, 74k2 extend through the surfaces 60k, 62k. In the illustrated embodiment, the passages 74a1, 74a2 are substantially aligned with a respective one of the passages 74k1, 74k2. In modified embodiments, other suitable number of and configuration of passages 74 may be efficaciously used, as needed or desired.

In the illustrated embodiment of FIGS. 1, 3, 5 and 6, the passages 74a1, 74a2 are located about midway between the top and bottom surfaces 64a, 65a and the passages 74k1, 74k2 are located about midway between the top and bottom surfaces 64k, 65k. In modified embodiments, other suitable arrangements of windows 74 may be efficaciously used, as needed or desired.

In the illustrated embodiment of FIGS. 1, 3, 5 and 6, the passages 74a1, 74a2 are located on respective sides of the shaft-receiving hole 70a and the passages 74k1, 74k2 are located on respective sides of the shaft-receiving hole 70k. In modified embodiments, other suitable arrangements of windows 74 may be efficaciously used, as needed or desired.

As best seen in FIGS. 5 and 6, preferably, the passages 74a1, 74a2 and 74k1, 74k2 are substantially ellipsoidal or oval and each has a respective one of an inwardly tapering surface 76a1, 76a2, 76k1, 76k2 which terminates in a respective one of a substantially uniform sized sub-passage 78a1, 78a2, 78k1, 78k2 which have a substantially rectangular shape with curved side ends. In modified embodiments, the passages 78 may efficaciously be shaped in other suitable manners, for example, other curved, rounded, polygonal shapes, combinations thereof, and the like, as needed or desired.

Referring in particular to FIGS. 3, 5 and 6, each of the sub-passages 78a1, 78a2, 78k1, 78k2 has a respective one of a generally flat bottom surface 80a1, 80a2, 80k1, 80k2. Each of the bottom surfaces 80a1, 80a2, 80k1, 80k2 has a respective plurality of width-wise extending indicia or marks 82a1, 82a2, 82k1, 82k2 which facilitate in the alignment between the doweling jig 10 and the workpiece 20, as discussed further below. Advantageously, the configuration of the windows 74a1, 74a2, 74k1, 74k2 allows the user to easily view the indicia 82 on the main jaws 42 and also on the tilting jaws 52 and bushing plate 34, as discussed further below.

Figure 7:
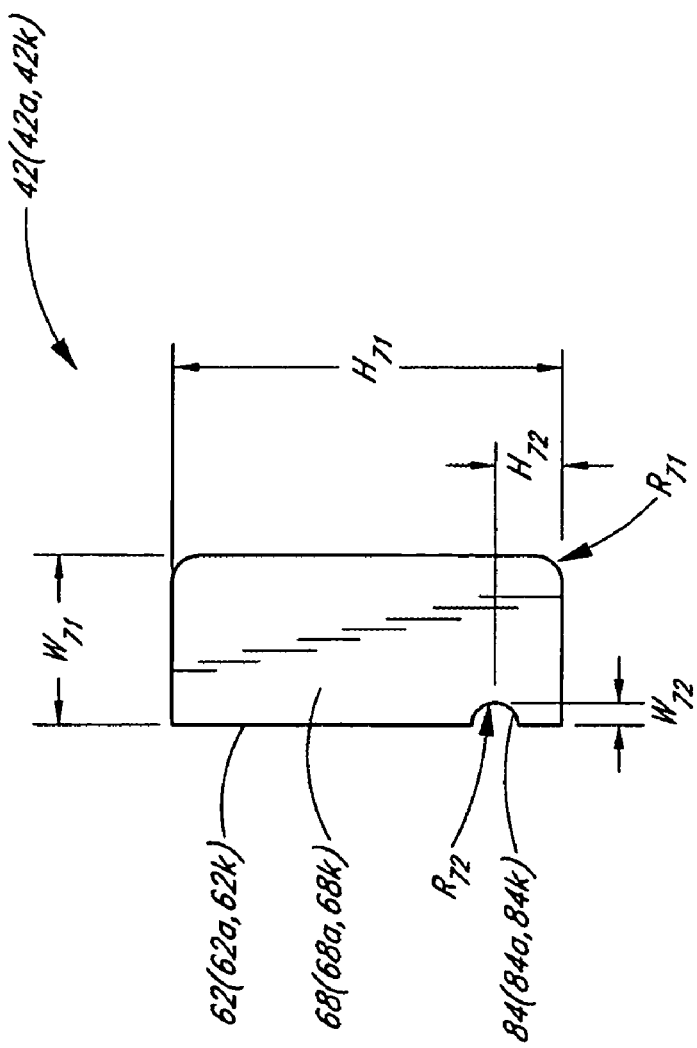
FIG. 7 is a simplified end view of the jaws of FIG. 5.

As best seen in FIGS. 3, 6 and 7, each of the main jaw inner surfaces 62a, 62k has a respective one of a generally curved or rounded groove 84a, 84k with a respective one of a generally curved or rounded surface 85a, 85k. The grooves 84a, 84k engage a respective one of the hinge assemblies 54a, 54k, as discussed further below. Preferably, the grooves 84a, 84k extend along substantially the entire length span of a respective one of the main jaw inner surfaces 62a, 62k or the main jaws 42a, 42k. The grooves 84a, 84k are located below the sub-passages 78.

Referring in particular to FIG. 6, each of the grooves 84a, 84k has a respective pair of spaced holes 86a1, 86a2 and 86k1, 86k2. The holes 86a1, 86a2 and 86k1, 86k2 comprise female threads and receive screws to connect the hinge assemblies 54a, 54k to a respective one of the main jaws 42a, 42k, as discussed further below.

As best seen in FIG. 8, at least one of the main jaw top surfaces 64 has a plurality of numbers 88 thereon corresponding to drill bit sizes. The numbers 88 are spaced by predetermined distances and are aligned with drill bit-receiving holes of varying size on the bushing plate 34, as discussed further below. The numbers 88 may be in inch fractions or inches or they may be in SI units or both, as needed or desired.

Still referring in particular to FIG. 8, the numbers 88 are preferably formed by laser cutting or etching to provide a light gray appearance on a dark gray background. In modified embodiments, other techniques may be efficaciously utilized, for example, applying paint, enamel or stickers, among others, as needed or desired.

The main jaws 42 are formed from a suitably strong and durable material. Preferably, the main jaws 42 comprise Aluminum 6061-T6511. The main jaws 42 preferably have a natural hard anodized finish to provide abrasion and corrosion resistance, among others, and which also results in a substantially dark gray color. In modified embodiments, other suitable alloys, metals, plastics, ceramics, combinations thereof, among others, with or without surface coatings or finishes, may be efficaciously utilized, as needed or desired.

Referring in particular to FIG. 5, the length $L_{51}$ is about 1.09 cm (0.430 inches), the length $L_{52}$ is about 2.22 cm (0.875 inches), the length $L_{53}$ is about 6.35 cm (2.500 inches), the length $L_{54}$ is about 7.94 cm (3.125 inches), the length $L_{55}$ is about 9.53 cm (3.750 inches), the length $L_{56}$ is about 13.65 cm (5.375 inches), the length $L_{57}$ is about 14.78 cm (5.820 inches) and the length $L_{58}$ is about 15.88 cm (6.250 inches). In other embodiments, other suitable dimensions may be utilized with efficacy, as needed or desired.

Still referring in particular to FIG. 5, the height $H_{51}$ is about 3.81 cm (1.500 inches), the heights $H_{52}$ and $H_{53}$ are about 4.92 cm (1.938 inches) and the height $H_{54}$ is about 6.50 cm (2.560 inches). In other embodiments, other suitable dimensions may be utilized with efficacy, as needed or desired.

Still referring in particular to FIG. 5, the holes 70 have a diameter $D_{51}$ of about 1.75 cm (11/16 inches), the first jaw holes 72a1, 72a2, 72a3, 72a4 have a diameter $D_{52}$ of about 0.953 cm (0.375 inches) and the second jaw holes 72k1, 72k2, 72k3, 72k4 have a diameter $D_{52}$ of about 0.973 cm (0.383 inches). In other embodiments, other suitable dimensions may be utilized with efficacy, as needed or desired.

Still referring in particular to FIG. 5, the through holes 70 and 72 are preferably formed by reaming. In modified embodiments, other suitable techniques may be efficaciously utilized, as needed or desired.

Still referring in particular to FIG. 5, the window tapered surfaces 76 are formed by the equivalent of an about 82° countersink and the windows 74 have a major height $H_{55}$ of about 3.89 cm (1.530 inches) and a minor height $H_{56}$ of about 1.70 cm (0.670 inches). In other embodiments, other suitable dimensions may be utilized with efficacy, as needed or desired.

Still referring in particular to FIG. 5, the indicia 82 comprise substantially V-shaped grooves cut at about 60° and have a depth of about 0.51 mm (0.02 inches). In other embodiments, other suitable dimensions may be utilized with efficacy, as needed or desired. In modified embodiments, the visual indicia may efficaciously comprise other suitable shapes, for example, U-shaped, C-shaped, rectangular, flat and the like, as needed or desired.

Referring in particular to FIG. 6, the length $L_{61}$ is about 5.08 cm (2.00 inches), the length $L_{62}$ is about 10.8 cm (4.250 inches), the height $H_{61}$ is about 1.19 cm (0.47 inches), the holes 86 have a diameter $D_{61}$ formed by a 8–32 drill, have a depth of about 9.53 mm (0.375 inches) and are tapped or threaded to a depth of about 7.87 mm (0.310 inches). In other embodiments, other suitable dimensions may be utilized with efficacy, as needed or desired.

Referring in particular to FIG. 7, the height $H_{71}$ is about 7.62 cm (3.00 inches), the width or thickness $W_{71}$ is about 1.91 cm (0.750 inches), the radius of curvature $R_{71}$ at all exterior corners of the jaws 42 is about 4.76 mm (3/16 inches), the groove height $H_{72}$ is about 1.19 cm (0.47 inches), the groove depth $W_{72}$ is about 5.59 mm (0.220 inches) and the groove radius of curvature $R_{72}$ is about 6.35 mm (0.250 inches). In other embodiments, other suitable dimensions may be utilized with efficacy, as needed or desired.

Referring in particular to FIG. 8, the length $L_{81}$ is about 2.57 cm (1.01 inches), the length $L_{82}$ is about 4.23 cm (1.665 inches), the length $L_{83}$ is about 5.51 cm (2.170 inches), the length $L_{84}$ is about 6.48 cm (2.550 inches), the length $L_{85}$ is about 9.73 cm (3.830 inches), the length $L_{86}$ is about 11.0 cm (4.330 inches), the length $L_{87}$ is about 12.1 cm (4.750 inches) and the length $L_{88}$ is about 13.5 cm (5.310 inches). In other embodiments, other suitable dimensions may be utilized with efficacy, as needed or desired.

The main jaws 42 can be fabricated by using a number of manufacturing techniques. In one embodiment, the jaws 42 are fabricated by utilizing machining operations. In other embodiments, the jaws 42 may be fabricated by other methods, for example but not limited to casting, forging, molding, laser cutting and/or processing, laminating, adhesively fixing, welding, combinations thereof, among others, with efficacy, as needed or desired.

Bushing Plate

Figures 9, 10:
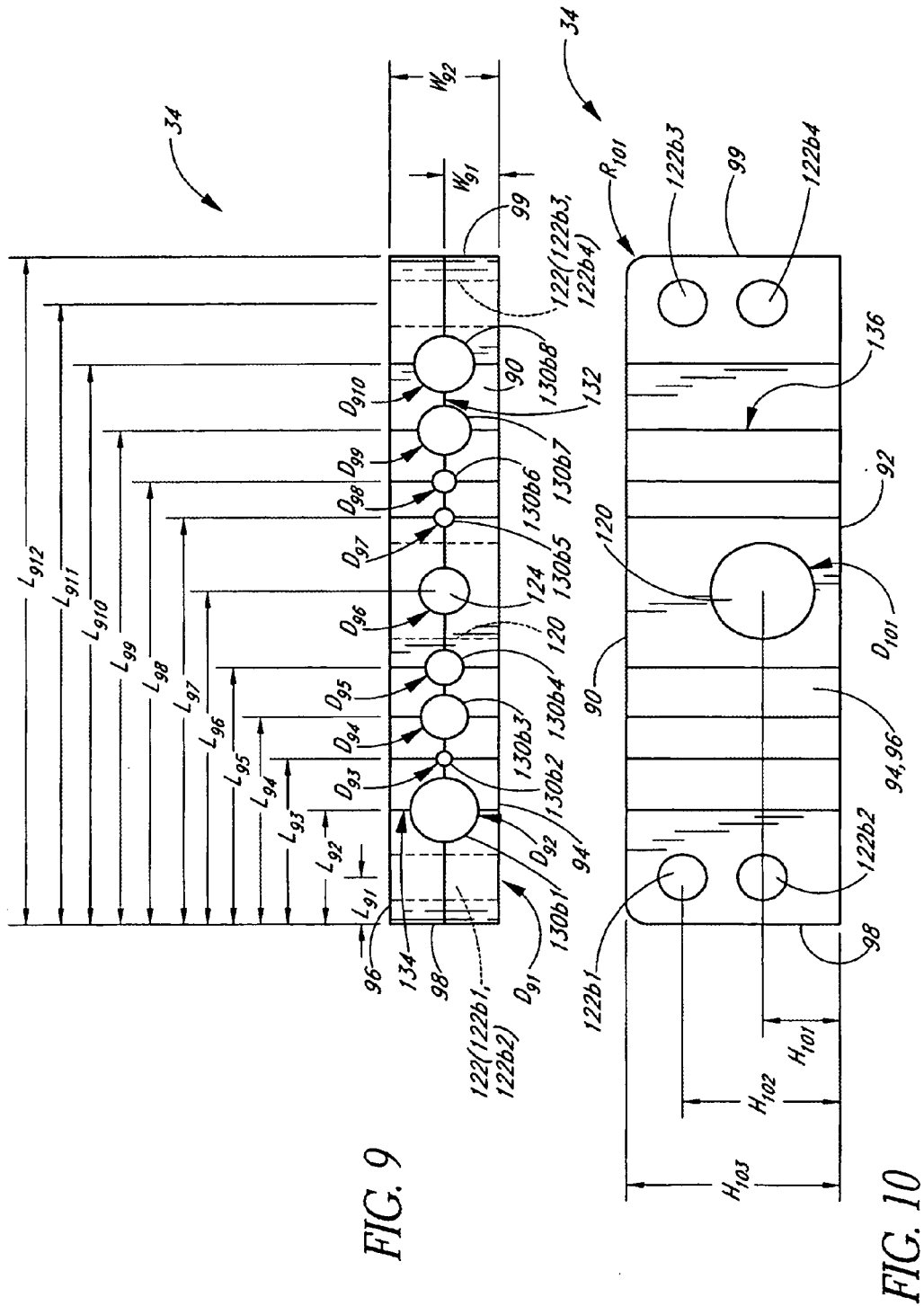
FIG. 9 is a simplified top view of a bushing plate of the doweling jig of FIG. 1 having features and advantages in accordance with one embodiment of the invention.
FIG. 10 is a simplified side view of the bushing plate of FIG. 9.

FIGS. 9 and 10 show different view of the bushing plate or tool 34. In the illustrated embodiment, the bushing plate 34 is substantially rectangular and preferably has rounded upper exterior corners and edges. In modified embodiments, the bushing plate may be shaped in other suitable manners with efficacy, as needed or desired.

Referring in particular to FIGS. 1–4, 9 and 10, the bushing plate 34 is substantially centered with respect to and between the two main jaws 42. The bushing plate 34 is fixed in position relative to the shaft assembly 31, as discussed further below, while the jaws 34 are movable relative to the shaft assembly 31.

Referring in particular to FIGS. 3, 9 and 10, the bushing plate 34 has a top or upper face or surface 90, a bottom or lower surface or face 92, a pair of side faces or surfaces 94, 96 and a pair of end faces or surfaces 98, 99. As best seen in FIG. 4, the bushing upper surface 90 is substantially level or aligned with the main jaw upper surfaces 64a, 64k. Also as best seen in FIG. 4, the bushing lower surface 92 is substantially flat and slightly above the tilting jaws 52a, 52k. In use, the lower surface 92 abuts against the workpiece 20.

Still referring in particular to FIG. 4, the bushing side surfaces 94, 96 are generally flat and extend substantially parallel to one another and to the main jaw inner surfaces 62a, 62k. The bushing end surfaces 98, 99 are generally flat and extend substantially parallel to one another and to the main jaw end surfaces 66, 68.

Referring to the drawings, and in particular to FIGS. 3, 9 and 10, the bushing plate 34 has a substantially round through hole or passage 120 extending through the side surfaces pairs 94, 96. The hole 120 receives the shaft assembly 31, as discussed further below. The hole 120 is substantially aligned with the main jaw holes 70a, 70k. The hole 120 is located at generally half-way between the side surfaces 98, 99 and is closer to the lower surface 92 than the upper surface 90.

Referring in particular to FIGS. 3, 9 and 10, the bushing plate 34 has two pairs of substantially round through holes or passages 122b1, 122b2 and 122b3, 122b4. The holes 122 receive the guide pins 74, as discussed further below.

Still referring in particular to FIGS. 3, 9 and 10, the holes 122b1, 122b2, 122b3, 122b4 extend through the side surfaces 94, 96. The bushing plate holes 122b1, 122b2, 122b3, 122b4 are substantially aligned with a respective one of the first main jaw holes 72a1, 72a2, 72a3, 72a4. The bushing plate holes 122b1, 122b2, 122b3, 122b4 are substantially aligned with a respective one of the second main jaw holes 72k1, 72k2, 72k3, 72k4.

Still referring in particular to FIGS. 3, 9 and 10, the pair of holes 122b1, 122b2 are proximate the side surface 98 and the hole 122b1 is proximate the top surface 90. The holes 122b1, 122b2 are substantially vertically aligned with one another with the hole 122b1 being above the hole 122b2. The pair of holes 122b3, 122b4 are proximate the side surface 99 and the hole 122b3 is proximate the top surface 90. The holes 122b3, 122b4 are substantially vertically aligned with one another with the hole 122b3 being above the hole 122b4.

As best seen in FIG. 10, the holes 122b1 and 122b3 are substantially horizontally aligned with one another. The holes 122b2, 122b4 are substantially horizontally aligned with one another and with the shaft receiving hole 120.

Referring to the drawings, and in particular to FIGS. 3 and 9, the bushing plate 34 includes a substantially round vertically extending hole 124 in fluid communication with the shaft-receiving passage 120. The hole 124 has a longitudinal axis substantially perpendicular to the longitudinal axis of the passage 120. As discussed further below, the hole 124 receives a stop bolt which engages the shaft assembly 31 and locks the bushing plate 34 in generally fixed operative association with the shaft assembly 31.

Still referring in particular to FIGS. 3 and 9, the hole 124 is threaded with female threads. The hole 124 is located substantially centrally relative to the side surfaces 94, 96 and the end surfaces 98, 99. The hole 124 extends inwards from the top surface 90. The hole 124 may extend completely through the bushing plate 34 from the top surface 90 to the bottom surface 92 or may terminate at the passage 120 or at an intermediate point therebetween.

Referring to the drawings, and in particular to FIGS. 3 and 9, the bushing plate 34 includes a plurality of through holes or bores 130 located at predetermined positions and having predetermined sizes for receiving drill bits of varying size. The holes are arranged in a column or linear or one dimensional array (1×N).

In the illustrated embodiment, the bushing plate 34 has a linear array (1×8) of eight holes 130b1, 130b2, 130b3, 130b4, 130b5, 130b6, 130b7, 130b8 with four on each side of the hole 124. In modified embodiments, fewer or more holes 130 may be efficaciously utilized in modified arrangements, as needed or desired. For example, a two dimensional array (M×N) of holes 130 may be utilized or the holes 130 may be arranged in a circular, stepped, polygonal or zig zag manner, and combinations thereof, among others, as needed or desired.

In the illustrated embodiment, and referring on particular to FIGS. 3, 9 and 10, the holes or passages 130 are substantially round and extend substantially parallel to one another and to the bushing side surfaces 94, 96 and end surfaces 98, 99. The holes 130 extend between the bushing upper and lower surfaces 90, 92 and have longitudinal axes substantially perpendicular to these surfaces 90, 92. The holes 130 are located substantially centrally relative to the side surfaces 94, 96 and between the pairs of holes 122b1, 122b2 and 122b3, 122b4.

Referring in particular to FIGS. 8 and 9, each of the holes 130 is substantially aligned with a corresponding drill bit size number 88 on the main jaw(s) 42 and is sized and configured to receive that particular drill bit size with a close tolerance fit. More specifically, the holes 130b1, 130b2, 130b3, 130b4, 130b5, 130b6, 130b7, 130b8 respectively correspond to and are aligned with ¾, 3/16, 7/16, ⅜, ¼, 5/16, ½, ⅝ numbers 88.

Referring in particular to FIGS. 9 and 10, the bushing plate upper surface 90 has a plurality of length-wise extending indicia or marks 132 and a plurality of width-wise extending indicia or marks 134. The bushing plate side surfaces 94, 96 have a plurality of vertically extending indicia or marks 136. In some embodiments, the bushing plate lower surface 92 has a plurality of visual indicia or marks generally corresponding to those of the upper surface 90. As discussed in further detail below, the indicia 132, 134, 136 facilitate in the alignment between the doweling jig 10, including the drill-receiving holes 130 of the bushing plate 34, and the workpiece 20.

The bushing plate 34 is formed from a suitably strong and durable material. Preferably, the bushing plate 34 comprises A-2 Tool Steel with a Rc hardness of about 62, though other suitable hardness values may be efficaciously utilized, as needed or desired. The bushing plate 34 preferably has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIG. 9, the length $L_{91}$ is about 1.09 cm (0.430 inches), the length $L_{92}$ is about 2.57 cm (1.01 inches), the length $L_{93}$ is about 4.23 cm (1.665 inches), the length $L_{94}$ is about 5.51 cm (2.17 inches), the length $L_{95}$ is about 6.48 cm (2.55 inches), the length $L_{96}$ is about 7.94 cm (3.125 inches), the length $L_{97}$ is about 9.73 cm (3.830 inches), the length $L_{98}$ is about 11.0 cm (4.330 inches), the length $L_{99}$ is about 12.1 cm (4.75 inches), the length $L_{910}$ is about 13.49 cm (5.310 inches), the length $L_{911}$ is about 14.78 cm (5.820 inches) and the bushing plate length $L_{912}$ is about 15.88 cm (6.250 inches). In other embodiments, other suitable dimensions may be utilized with efficacy, as needed or desired.

Still referring in particular to FIG. 9, the width $W_{91}$ is about 1.27 cm (0.500 inches) and the bushing width or thickness $W_{92}$ is about 2.54 cm (1.00 inches). In other embodiments, other suitable dimensions may be utilized with efficacy, as needed or desired.

Still referring in particular to FIG. 9, the holes 122 have a diameter $D_{91}$ of about 9.73 mm (0.383 inches), the diameter $D_{92}$ is about 1.91 cm (0.750 inches), the diameter $D_{93}$ is about 4.78 mm (0.188 inches), the diameter $D_{94}$ is about 1.11 cm (0.437 inches), the diameter $D_{95}$ is about 9.53 mm (0.375 inches), the threaded diameter $D_{96}$ is formed by a ½-20 drill/tap bit, the diameter $D_{97}$ is about 6.35 mm (0.250 inches), the diameter $D_{98}$ is about 7.92 mm (0.312 inches), the diameter $D_{99}$ is about 1.27 cm (0.500 inches) and the diameter $D_{910}$ is about 1.59 cm (0.625 inches). In other embodiments, other suitable dimensions may be utilized with efficacy, as needed or desired.

Referring in particular to FIG. 10, the height $H_{101}$ is about 1.11 cm (0.438 inches), the height $H_{102}$ is about 2.69 cm (1.06 inches), the bushing height $H_{103}$ is about 3.81 cm (1.5 inches), the diameter $D_{101}$ is about 1.91 cm (0.750 inches) and the radius of curvature $R_{101}$ of the top corners of the bushing 34 is about 4.76 mm (³⁄₁₆ inches). In other embodiments, other suitable dimensions may be utilized with efficacy, as needed or desired.

Referring in particular to FIGS. 9 and 10, the indicia 132, 134, 136 comprise substantially V-shaped grooves cut at about 60° and have a depth of about 0.51 mm (0.02 inches). In other embodiments, other suitable dimensions may be utilized with efficacy, as needed or desired. In modified embodiments, the visual indicia may efficaciously comprise other suitable shapes, for example, U-shaped, C-shaped, rectangular, flat and the like, as needed or desired.

The bushing plate 34 can be fabricated by using a number of manufacturing techniques. In one embodiment, the bushing plate 34 is fabricated by utilizing machining operations. In other embodiments, the bushing plate 34 may be fabricated by other methods, for example but not limited to casting, forging, molding, laser cutting and/or processing, laminating, adhesively fixing, welding, combinations thereof, among others, with efficacy, as needed or desired.

Guide Mechanism

Referring to the drawings, and in particular to FIGS. 1–3 and 11, the guide mechanism includes a plurality of alignments dowels or guide rods 150. In the illustrated embodiments, four guide rods 150$g$1, 150$g$2, 150$g$3, 150$g$4 are provided. In modified embodiments, fewer or more guide rods 150 may be utilized with efficacy, as needed or desired.

In the illustrated embodiment, the guide rods 150 extend substantially perpendicularly to the jaws 42 and the bushing plate 34. More specifically, the guide rods 150 extend substantially perpendicularly to the jaw outer and inner surfaces 60, 62 and the bushing side surfaces 94, 96.

Figure 11:
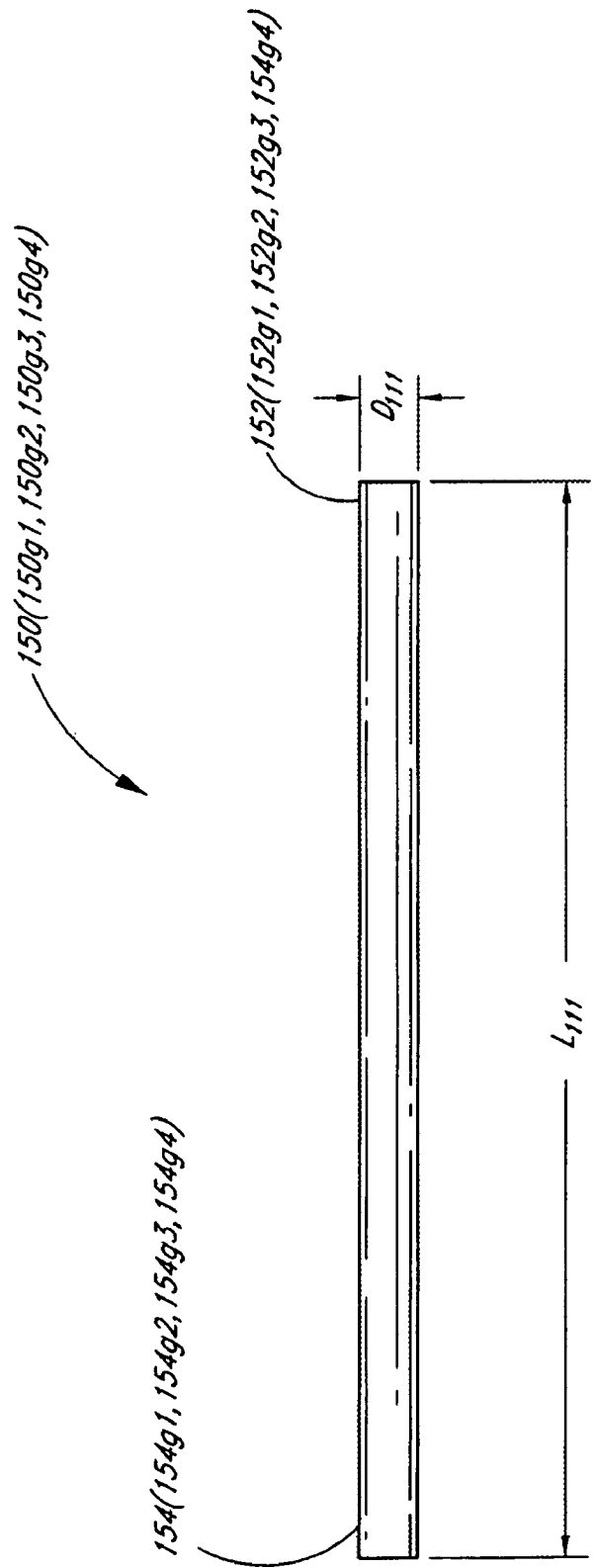
FIG. 11 is a simplified side view of guide rods of the doweling jig of FIG. 1 having features and advantages in accordance with one embodiment of the invention.

Referring in particular to FIGS. 3 and 11, each of the guide rods 150$g$1, 150$g$2, 150$g$3, 150$g$4 has a respective one of a fixed proximal end 152$g$1, 152$g$2, 152$g$3, 152$g$4 and a respective one of a free distal end 154$g$1, 154$g$2, 154$g$3, 154$g$4. The proximal ends 152$g$1, 152$g$2, 152$g$3, 152$g$4 are securely attached to the first main jaw 42$a$ and are received in a respective one of the first jaw holes 72$a$1, 72$a$2, 72$a$3, 72$a$4. Preferably, the proximal ends 152 terminate such that they are substantially flush with the jaw outer surface 60$a$.

The guide rods 150 may be secured to the main jaw 42$a$ utilizing a wide variety of techniques. For example, press fitting, hydraulically clamping, welding, adhesively attaching such as by using Loctite or other adhesive materials or glues, using screws, connector pins or other fasteners, and combinations thereof, among others, as needed or desired.

Referring in particular to FIGS. 1–3 and 11, the guide rods 150 slidably extend through the bushing plate 34 and the second main jaw 42$k$. Preferably, when the doweling jig 10 is in its fully open position, the guide rod distal ends 154 terminate such that they are substantially flush with the jaw outer surface 60$k$ or extend only slightly out of and beyond the main jaw surface 60$k$.

Still referring in particular to FIGS. 1–3 and 11, the guide rods or dowels 150$g$1, 150$g$2, 150$g$3, 150$g$4 extend through a respective one of the bushing plate holes 122$b$1, 122$b$2, 122$b$3, 122$b$4 and a respective one of the second jaw holes 72$k$1, 72$k$2, 72$k$3, 72$k$4. The guide rods 150 are fixed in position relative to the first jaw 42$a$ and slideably movable through and relative to the bushing plate 34 and second jaw 42$k$ when the shaft assembly 31 is operated.

Advantageously, the redundant guide mechanism of embodiments of the invention utilizes two pairs of longitudinally spaced guide rods. That is, the pair with vertically offset guide rods 150$g$1, 150$g$2 and the pair with vertically offset guide rods 150$g$3, 150$g$4. This provides improved alignment and accurate functioning and clamping. Also, desirably, the redundant guide mechanism mitigates the cantilever force problem, as discussed further below. In some embodiments, additional redundancy may be provided by utilizing more guide rods, as needed or desired.

The guide rods 150 are formed from a suitably strong and durable material. Preferably, the guide rods 150 comprise 304 Stainless Steel Alloy. In some embodiments, the guide rods 150 have a black oxide finish. In modified embodiments, other suitable alloys, metals, plastics, ceramics, combinations thereof, among others, with or without surface coatings or finishes, may be efficaciously utilized, as needed or desired.

Referring in particular to FIG. 11, the guide pins or rods 150 have a length $L_{111}$ of about 12.7 cm (5 inches). In the illustrated embodiment, the guide rods 150 are generally cylindrical in shape and have a diameter $D_{111}$ of about 9.53 mm (0.375 inches). In other embodiments, other suitable dimensions may be utilized with efficacy, as needed or desired.

The guide rods 150 can be fabricated by using a number of manufacturing techniques, for example, by utilizing commercially available steel stock. In one embodiment, the guide rods 150 are fabricated by utilizing machining operations. In other embodiments, the guide rods 150 may be fabricated by other methods, for example but not limited to casting, forging, molding, laser cutting and/or processing, laminating, adhesively fixing, welding, combinations thereof, among others, with efficacy, as needed or desired.

Shaft Assembly

Referring in particular to FIGS. 1, 3 and 12–21, the shaft assembly 31 generally comprises the screw shaft 32, the knob 36, two thread inserts 160a, 160k, a locator stop bolt 162, a thread stop assembly 164 and a screw-pin assembly 166 to connect the shaft 32 and the knob 36. As discussed further below, operation of the shaft assembly 31 causes movement of the main jaws 42 while maintaining the bushing plate 34 operatively fixed and substantially centered relative to the jaws 42.

In the illustrated embodiment of FIGS. 12–15, the tension knob 36 has a handle portion 170 mechanically connected to a shank or stem portion 172. In the illustrated embodiment, the knob 36 comprises an integral unit, though in modified embodiments it may comprise individual components which are subsequently connected during assembly.

Referring in particular to FIGS. 12–15, the handle 170 is generally circular or round in shape and has a knurled gripping surface 174 to facilitate operation by a user. As best seen in FIG. 13, the gripping surface 174 preferably has heavy straight knurls 176. Other ergonomic shapes and the like may be efficaciously utilized to facilitate operation, as needed or desired, for example, an arrangement of contoured surfaces which are generally adapted to the biomechanics of a human hand.

In the illustrated embodiment of FIGS. 12–15, the knob 170 has a generally flat front face 178 with a generally circumferential annular recess or groove 179 in which a label or the like is received and an opposed generally annular recess 180 proximate to the shank 172. Advantageously, the recess 180 reduces the overall device weight.

Referring in particular to FIGS. 12 and 15, the shank 172 extends from the handle 170 and is generally cylindrical in shape and has a free or distal end 182. The shank 170 includes a transverse or lateral through passage 184 spaced from the distal end 182 and a longitudinal threaded opening 186 extending inwards form the distal end 182. As discussed further below, in some embodiments, the knob 36 is connected to the screw shaft 32 by a roll pin that extends through the passage 184 and through a screw element engaged with the threaded opening 186.

FIGS. 16 and 17 illustrate modified embodiments of the knob 36'. In these embodiments, the knob handle 170' has a plurality of through holes 188 arranged substantially around the shank 172'. Advantageously, the holes 188 reduce the overall device weight. The holes 188 may be used in combination with the recess 180 or as an independent feature, as needed or desired.

As best seen in FIGS. 12 and 17, the modified shank 172' is larger in diameter than the shank 172 and has an opening 186' which receives an end of the screw shaft 32. The opening 186' may be threaded or smooth. In this embodiment, the knob shank 172' is secured to the screw shaft 32 by using Loctite or other adhesive materials or glues. This may be done in combination with a roll pin or independently, as needed or desired.

The knob 36 is formed from a suitably strong and durable material. Preferably, the knob 36 comprises Aluminum 6061-T6511. The knob 36 preferably have a black hard anodized finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIG. 12, the length $L_{121}$ is about 6.35 mm (0.250 inches), the length $L_{122}$ is about 1.27 cm (0.5 inches), the knob length $L_{123}$ is about 2.54 cm (1 inch), the handle diameter $D_{121}$ is about 5.08 cm (2 inches), the shank diameter $D_{122}$ is about 1.27 cm 0.5 inches), the hole diameter $D_{123}$ is about 3.2 mm (⅛ inches) and the threaded opening 186 (see FIG. 15) is formed using a ⅜-16 drill/tap bit and has a depth of about 1.91 cm (0.75 inches). In other embodiments, other suitable dimensions may be utilized with efficacy, as needed or desired.

Referring in particular to FIG. 14, the recess 179 has a width or thickness of about 3.2 mm (⅛ inches) and a depth of about 1.6 mm (1/16 inches). In other embodiments, other suitable dimensions may be utilized with efficacy, as needed or desired.

The knob 36 can be fabricated by using a number of manufacturing techniques. In one embodiment, the knob 36 is fabricated by utilizing machining operations. In other embodiments, the knob 36 may be fabricated by other methods, for example but not limited to casting, forging, molding, laser cutting and/or processing, laminating, adhesively fixing, welding, combinations thereof, among others, with efficacy, as needed or desired.

Referring to the drawings, and in particular to FIGS. 3 and 18, the screw shaft 32 includes a generally cylindrical first side portion 200a and a generally cylindrical second side portion 200k. The side portions 200a, 200k are spaced by a generally cylindrical central portion 202 and an annular gap or recessed portion 204.

Still referring in particular to FIGS. 3 and 18, the screw shaft 32 has a generally longitudinal axis 206. In the illustrated embodiment, the screw shaft 32 and its axis 206 extend substantially parallel to the guide rods 150. The screw shaft 32 and its axis 206 extend substantially perpendicularly to the jaws 42 and the bushing plate 34. More specifically, the screw shaft 32 and its axis 206 extend substantially perpendicularly to the jaw outer and inner surfaces 60, 62 and the bushing side surfaces 94, 96.

Referring in particular to FIG. 18, the first portion 200a has a generally smooth section 208a adjacent the center portion 202 and a threaded portion 212a extending from the section 208a to a first end 214a. In the illustrated embodiment, the threaded portion 212a includes right hand male threads 216a.

Still referring in particular to FIG. 18, the second portion 200k has a generally smooth section 208k adjacent the center portion 202 and a threaded portion 212k extending from the section 208k to a second end 214k. In the illustrated embodiment, the threaded portion 212k includes left hand male threads 216k, that is, in an opposed configuration relative to the threads 216a.

As discussed further below, the threaded portions 212*a*, 212*k* extend through a respective one of the jaw holes 70*a*, 70*k*. The central portion 202, the gap 204 and the unthreaded sections 208 are located generally within the bushing plate hole 120.

In the illustrated embodiment of FIG. 18, the shaft portion 200*a* has a threaded opening 218 extending inwardly from the end 214*a*. The threaded opening 218 receives a set screw 220 which has a through passage 222 which receives a roll pin 224.

More specifically, in some embodiments, the set screw 220 threadably engages the threaded opening 186 (see FIG. 15) of the knob 36 such that the holes 184, 222 are substantially aligned receive the roll pin 224 to connect the knob 36 to the screw 220 which in turn is threadably engaged with the shaft threaded opening 218. In this manner, the assembly 166 securely connects the shaft 32 and the knob 36. In some embodiments, the knob 32 and the screw shaft 32 may be formed as an integral element or unit, as needed or desired.

Rotation of the knob 36 by a user causes the main jaws 42 to move towards or away form one another. In the illustrated embodiment, clockwise rotation of the knob 36 causes the jaws 42 to close or move towards one another and counter-clockwise rotation of the knob 36 causes the jaws 42 to open or move away from one another. Of course, embodiments of the doweling jig may be efficaciously configured to perform in the opposite manner, as needed or desired. For example, by substituting the illustrated arrangement of the right hand threads with the left hand threads and vice versa.

Referring in particular to FIGS. 3 and 18, the thread stop assembly 164 generally comprises a substantially circular thread stop member 230 with a through hole 232 and a screw 234. The stop member 230 engages the shaft end 214*k* and the screw 232 passes through the opening 232 and is threadably engaged with a threaded opening 236 of the shaft portion 200*k*.

In the illustrated embodiment, the opening 236 extends inwardly from the end 214*k*. In some embodiments, Loctite or other adhesive materials or glues may be used to further secure the thread stop assembly 164 to the shaft end 214*k*. Advantageously, the thread stop assembly 164 prevents the screw shaft 32 from exiting the jaw hole 70*k* as at maximum extension the stop member 230 abuts against the jaw outer surface 60*k*.

The screw shaft 32 is formed from a suitably strong and durable material. Preferably, the screw shaft 32 comprises A-2 Tool Steel with a Rc hardness of about 62, though other suitable hardness values may be efficaciously utilized, as needed or desired. The screw shaft 32 preferably has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired. To facilitate operation and prevent galling, the threaded portions 212 may have a suitable lubricant applied thereon, for example, grease, oil, silicone, among others.

Referring in particular to FIG. 18, the length $L_{181}$ is about 5.08 cm (2.000 inches), the length $L_{182}$ is about 6.03 cm (2.375 inches), the length $L_{183}$ is about 6.67 cm (2.625 inches), the length $L_{184}$ is about 7.62 cm (3.000 inches) and the length $L_{185}$ is about 12.7 cm (5.00 inches). In other embodiments, other suitable dimensions may be utilized with efficacy, as needed or desired.

Still referring in particular to FIG. 18, the shaft diameter $D_{181}$ is about 1.9 cm (¾ inches), the threaded portion 212*a* comprises ¾-20 right hand (RH) threads, the shaft diameter $D_{182}$ is about 1.9 cm (¾ inches), the threaded portion 212*k* comprises ¾-20 left hand (LH) threads, the diameter $D_{183}$ is about 1.27 cm (½ inches) and the threaded opening 218 is formed using a ⅜-16 drill/tap bit and has a depth of about 1.9 cm (¾ inches). In other embodiments, other suitable dimensions may be utilized with efficacy, as needed or desired.

The screw shaft 32 can be fabricated by using a number of manufacturing techniques. In one embodiment, the screw shaft 32 is fabricated by utilizing machining operations. In other embodiments, the screw shaft 32 may be fabricated by other methods, for example but not limited to casting, forging, molding, laser cutting and/or processing, laminating, adhesively fixing, welding, combinations thereof, among others, with efficacy, as needed or desired.

Referring in particular to FIG. 18, the roll pin 224 has a diameter $D_{184}$ of about 3.2 mm (⅛ inches) and a length of about 1.27 cm (½ inches). In other embodiments, other suitable dimensions may be utilized with efficacy, as needed or desired.

The roll pin 224 is formed from a suitably strong and durable material. Preferably, the roll pin 224 comprises stainless steel. In some embodiments, the roll pin 224 has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Still referring in particular to FIG. 18, the screw length $L_{186}$ is about 1.91 cm (0.750 inches), the length $L_{187}$ is about 6.35 mm (0.250 inches), the hole diameter $D_{185}$ is about 3.2 mm (⅛ inches) and the screw 220 has ⅜-16 male threads. In other embodiments, other suitable dimensions may be utilized with efficacy, as needed or desired.

The screw 220 is formed from a suitably strong and durable material. Preferably, the screw 220 comprises stainless steel. In some embodiments, the screw 220 has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

The stop member 230 is formed from a suitably strong and durable material. Preferably, the stop member 230 comprises stainless steel. In some embodiments, the stop member 230 has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

The screw 234 is formed from a suitably strong and durable material. Preferably, the screw 234 comprises stainless steel. In some embodiments, the screw 234 has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring to the drawings, and in particular to FIGS. 3, 19 and 20, the thread insert 160a is generally cylindrical in shape. The insert 160a has an outer knurled surface 240a preferably with medium straight knurls 242a. The insert 160a is secured within the first jaw hole 70a with the knurls 242a preferably extending generally parallel to the longitudinal axis of the hole 70a. Advantageously, the knurls 242a facilitate in forming a secure attachment between the insert 160a and the jaw 42a.

The insert 160a may be secured to the main jaw 42a utilizing a wide variety of techniques. In one embodiment, the insert 160a is secured to the main jaw 42a utilizing hydraulic clamping. Alternatively, or in addition, Loctite or other adhesive materials or glues may be used with efficacy, as needed or desired. Other techniques include, but are not limited to, press fitting, welding, using screws, connector pins or other fasteners, and combinations thereof, among others, as needed or desired.

Referring in particular to FIG. 20, the insert 160a has a generally circular threaded through passage or hole 244a. The passage 244a has right hand (RH) female threads 246a and is threadably engaged with the shaft threaded portion 212a.

Referring to the drawings, and in particular to FIGS. 3, 19 and 20, the thread insert 160k is generally cylindrical in shape. The insert 160k has an outer knurled surface 240k preferably with medium straight knurls 242k. The insert 160k is secured within the second jaw hole 70k with the knurls 242k preferably extending generally parallel to the longitudinal axis of the hole 70k. Advantageously, the knurls 242k facilitate in forming a secure attachment between the insert 160k and the jaw 42k.

The insert 160k may be secured to the main jaw 42k utilizing a wide variety of techniques. In one embodiment, the insert 160k is secured to the main jaw 42k utilizing hydraulic clamping. Alternatively, or in addition, Loctite or other adhesive materials or glues may be used with efficacy, as needed or desired. Other techniques include, but are not limited to, press fitting, welding, using screws, connector pins or other fasteners, and combinations thereof, among others, as needed or desired.

Referring in particular to FIG. 20, the insert 160k has a generally circular threaded through passage or hole 244k. The passage 244k has left hand (LH) female threads 246k and is threadably engaged with the shaft threaded portion 212k.

The inserts 160 are formed from a suitably strong and durable material so as to prevent gauling and seizure. Preferably, the inserts 160 comprise stainless steel. In some embodiments, the inserts 160 have a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIGS. 19 and 20, the insert length $L_{191}$ is about 1.91 cm (0.750 inches), the outer diameter $D_{201}$ is about 2.08 cm (0.820 inches), the inner diameter $D_{202}$ is about 1.91 cm (¾ inches), the threads 246a comprise ¾-20 right hand (RH) threads and the threads 246k comprise ¾-20 left hand (LH) threads.

The inserts 160 can be fabricated by using a number of manufacturing techniques. In one embodiment, the inserts 160 are fabricated by utilizing machining operations. In other embodiments, the inserts 160 may be fabricated by other methods, for example but not limited to casting, forging, molding, laser cutting and/or processing, laminating, adhesively fixing, welding, combinations thereof, among others, with efficacy, as needed or desired.

Referring to the drawings, and in particular to FIGS. 3 and 21, the locator stop bolt 162 has a generally cylindrical threaded upper portion 250 with male threads 252 and a generally cylindrical lower stop element 254. The threaded portion 250 is threadably engaged with the bushing plate hole 124 and the stop element extends into the bushing plate hole 120 and forms a high tolerance fit within the screw shaft gap 204. The stop element 254 may abut against the shaft center portion 202. The stop bolt 162 has a longitudinal axis 256 substantially perpendicular to the screw shaft longitudinal axis 206.

Advantageously, the stop bolt 162 locks the bushing plate 34 in fixed operative relationship to the screw shaft 32 and centered between and relative to the jaws 42. In operation, when a user rotates the knob 36 there is substantially no axial displacement of the bushing plate 34 (and screw shaft 32) but the jaws 42 move in the axial direction 58 (see, for example, FIGS. 1, 2 and 4) while the screw shaft 36 rotates. The jaws 42 are displaced the same distance thereby allowing the bushing plate 34 to remain centered relative to the jaws 42 (and tilting jaws 52).

The stop bolt 162 is formed from a suitably strong and durable material. Preferably, the stop bolt 162 comprises stainless steel. The stop bolt 162 preferably has a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIG. 21, the stop bolt length $L_{211}$ is about 1.91 cm (0.750 inches), the stop element length $L_{212}$ is about 5.1 mm (0.200 inches), the stop element diameter $D_{211}$ is about 6.30 mm (0.248 inches) and the threads 252 comprise ½-20 male threads.

The stop bolt 162 can be fabricated by using a number of manufacturing techniques. In one embodiment, the stop bolt 162 is fabricated by utilizing machining operations. In other embodiments, the stop bolt 162 may be fabricated by other methods, for example but not limited to casting, forging, molding, laser cutting and/or processing, laminating, adhesively fixing, welding, combinations thereof, among others, with efficacy, as needed or desired.

Tilting Jaws

As indicated above, the hinged jaw mechanism 40 includes the two tilting jaws 52a, 52k coupled to a respective one of the main jaws 42a, 42k by a respective one of the hinge or pivot pin mechanisms or assemblies 54a, 54k. The hinged jaws or clamping members 52a, 52k are movable along with the main jaws 42a, 42k and are spaced by a variable gap 56 (see FIG. 1) within which the workpiece 20 (see FIG. 4) is secured. The main jaws 42a, 42k and the hinged jaws 52a, 52k are movable in directions generally indicated by arrows 58.

FIGS. 22–26 show different views of the jaws 52a, 52k indicated by the common or like reference numeral 52. Since the jaws 52a, 52k are preferably similar in most features, as also indicated above, this reference numeral scheme is used to denote like parts in connection with the jaws 52.

In the illustrated embodiment of FIGS. 1–4 and 22–26, the tilting jaws 52a, 52k are substantially rectangular in shape and preferably have rounded lower exterior corners and edges. In modified embodiments, the tilting jaws may be shaped in other suitable manners with efficacy, as needed or desired.

Referring in particular to FIGS. 3 and 22–26, the jaws 52a, 52k have a respective outer surface or face 260a, 260k, a respective inner surface or face 262a, 262k, a respective top or upper surface or face 264a, 264k, a respective bottom or lower surface or face 265a, 265k, and respective pairs of end surfaces or faces 266a, 268a and 266k, 268k.

In the illustrated embodiment, the outer surfaces 262a, 262k are the clamping surfaces. The clamping surfaces 262a, 262k are preferably generally flat and smooth. The clamping surfaces 262a, 262k (and jaws 52a, 52k) are generally aligned with one another and generally face towards one another, of course, this may vary depending on how much each is pivoted.

As best seen in FIGS. 3, 23, 25 and 26, each of the jaw inner surfaces 262a, 262k has a respective one of a generally curved or rounded groove 284a, 284k with a respective one of a generally curved or rounded surface 285a, 285k. The grooves 284a, 284k engage a respective one of the hinge assemblies 54a, 54k, as discussed further below. Preferably, the grooves 284a, 284k extend along substantially the entire length span of a respective one of the jaw inner surfaces 262a, 262k or the jaws 52a, 52k. The grooves 284a, 284k are substantially aligned with and face a respective one of the main jaw grooves 84a, 84k.

Referring in particular to FIGS. 22 and 23, each of the grooves 284a, 284k has a respective pair of spaced through holes or passages 286a1, 286a2 and 286k1, 286k2. Each of the passages 286a1, 286a2, 286k1, 286k2 has a respective one of a countersink portion 287a1, 287a2, 287k1, 287k2 and an unthreaded (or threaded) generally cylindrical portion 289a1, 289a2, 289k1, 289k2, and receive screws to connect the hinge assemblies 54a, 54k to a respective one of the jaws 52a, 52k, as discussed further below.

Referring in particular to FIGS. 3 and 24, each of the upper surfaces 264a, 264k has a respective plurality of width-wise extending indicia or marks 282a, 282k which facilitate in the alignment between the doweling jig 10 and the workpiece 20, as discussed further below. The upper surfaces 264a, 264k are substantially level with a respective pair of the main jaw surfaces 80a1, 80a2 and 80k1, 80k2 with respective indicia 82a1, 82a2 and 82k1, 82k2. The indicia 282a, 282k are substantially aligned with a respective pair of the main jaw indicia 82a1, 82a2 and 82k1, 82k2.

The pivoting jaws 52 are formed from a suitably strong and durable material. Preferably, the pivoting jaws 52 comprise Aluminum 6061-T6511. The pivoting jaws 52 preferably have a natural hard anodized finish to provide abrasion and corrosion resistance, among others, and which also results in a substantially dark gray color. Preferably, at least the clamping surfaces 260 are sandblasted to provide smooth gripping surfaces. In modified embodiments, other suitable alloys, metals, plastics, ceramics, combinations thereof, among others, with or without surface coatings or finishes, may be efficaciously utilized, as needed or desired.

Referring in particular to FIG. 23, the length $L_{231}$ is about 1.27 cm (0.500 inches), the length $L_{232}$ is about 14.6 cm (5.750 inches) and the jaw length $L_{233}$ is about 15.9 cm (6.250 inches). In other embodiments, other suitable dimensions may be utilized with efficacy, as needed or desired.

Still referring in particular to FIG. 23, the groove height $H_{231}$ is about 1.19 cm (0.470 inches) and the jaw height $H_{232}$ is about 3.05 cm (1.200 inches). In other embodiments, other suitable dimensions may be utilized with efficacy, as needed or desired.

Still referring in particular to FIG. 23, the radius of curvature $R_{231}$ at the lower exterior corners of the jaws 52 is about 4.76 mm (3/16 inches), the holes 289 have a diameter $D_{231}$ of about 4.57 mm (0.180 inches) and the holes 287 have a diameter of about 1.00 cm (0.39 inches) and are formed by an about 82° countersink. In other embodiments, other suitable dimensions may be utilized with efficacy, as needed or desired.

Referring in particular to FIG. 24, the indicia 282 comprise substantially V-shaped grooves cut at about 60° and have a depth of about 0.51 mm (0.02 inches). In other embodiments, other suitable dimensions may be utilized with efficacy, as needed or desired. In modified embodiments, the visual indicia may efficaciously comprise other suitable shapes, for example, U-shaped, C-shaped, rectangular, flat and the like, as needed or desired.

Referring in particular to FIG. 25, the jaw width or thickness $W_{231}$ is about 3.81 cm (0.500 inches), the groove depth $W_{252}$ is about 5.59 mm (0.220 inches) and the groove radius of curvature $R_{252}$ is about 6.35 mm (0.250 inches). In other embodiments, other suitable dimensions may be utilized with efficacy, as needed or desired.

The pivoting jaws 52 can be fabricated by using a number of manufacturing techniques. In one embodiment, the pivoting jaws 52 are fabricated by utilizing machining operations. In other embodiments, the pivoting jaws 52 may be fabricated by other methods, for example but not limited to casting, forging, molding, laser cutting and/or processing, laminating, adhesively fixing, welding, combinations thereof, among others, with efficacy, as needed or desired.

Pivot Assembly

Referring to the drawings, and in particular to FIGS. 1–4 and 27–31, the hinged or pivot mechanisms or assemblies 54a, 54k generally comprise a respective one of an axle 320a, 320k and a respective one of a pair of side bullets or hinge elements 322a1, 322a2 and 322k1, 322k2. Various screws or the like are used to connect the axles 320 and the bullets 322 to the main jaws 42 and the pivoting jaws 52, as discussed further below.

Referring in particular to FIGS. 27–29, each of the axles 320a, 320k has a respective one of a generally cylindrical central body portion 324a, 324k. Each of the axles 320a, 320k includes a respective pair of generally cylindrical side pegs or rods 326a1, 326a2 and 326k1, 326k2.

Referring in particular to FIG. 27, each of the axles 320a, 320k has a respective pair of spaced through holes or passages 328a1, 328a2 and 328k1, 328k2. Each of the passages 328a1, 328a2, 328k1, 328k2 has a respective one of a countersink portion 330a1, 330a2, 330k1, 330k2 and a generally cylindrical portion 332a1, 332a2, 332k1, 332k2, and receive screws to connect the axles 320a, 320k to a respective one of the main jaws 42a, 42k, as discussed further below.

Referring in particular to FIGS. 27–31, the bullets 322 have a generally cylindrical shape. Each of the bullets 322a1, 322a2, 322k1, 322k2 has a respective one of a proximal end 334a1, 334a2, 334k1, 334k2 and a distal end 336a1, 336a2, 336k1, 336k2. From each of the proximal ends 334a1, 334a2, 334k1, 334k2 a respective one of an opening 338a1, 338a2, 338k1, 338k2 extends towards the respective distal end 336a1, 336a2, 336k1, 336k2. The openings 338a1, 338a2, 338k1, 338k2 receive a respective one of the axle pegs 326a1, 326a2, 326k1, 326k2.

Referring in particular to FIGS. 30 and 31, each of the bullets 322a1, 322a2, 322k1, 322k2 has a respective one of a threaded through hole 340a1, 340a2, 340k1, 340k2. The through holes 340 are positioned between the openings 338 and the distal ends 336 and extend in a direction generally perpendicular to the openings 338. The holes 340 receive screws to connect the bullet pairs 322a1, 322a2 and 322k1, 322k2 to a respective one of the pivoting jaws 52a, 52k, as discussed further below.

Referring to the drawings, and in particular to FIG. 3 and the drawings of the jaws 42, 52 and the hinge mechanism 54, screws 350a1, 350a2 connect the axle 320a to the main jaw 42a. More specifically, the screws 350a1, 350a2 are received in respective axle holes 328a1, 328a2 and are received in respective jaw threaded holes 86a1, 86a2 to operatively fix the axle 320a relative to the jaw 42a.

Screws 350k1, 350k2 connect the axle 320k to the main jaw 42k. More specifically, the screws 350k1, 350k2 are received in respective axle holes 328k1, 328k2 and are threadably received in respective jaw threaded holes 86k1, 86k2 to operatively fix the axle 320k relative to the jaw 42k.

Screws 360a1, 360a2 connect the pivoting jaw 52a to a respective one of the bullets 322a1, 322a2 which are rotatably coupled to the axle 320a. More specifically, the screws 360a1, 360a2 are received in respective jaw holes 286a1, 286a2 and threadably received in respective bullet holes 336a1, 336a2 to operatively fix the bullets 322a1, 322a2 relative to the jaw 52a. Thus, the jaw 52a rotates with the rotation of the bullets 322a1, 322a2.

Screws 360k1, 360k2 connect the pivoting jaw 52k to a respective one of the bullets 322k1, 322k2 which are rotatably coupled to the axle 320k. More specifically, the screws 360k1, 360k2 are received in respective jaw holes 286k1, 286k2 and threadably received in respective bullet holes 336k1, 336k2 to operatively fix the bullets 322k1, 322k2 relative to the jaw 52k. Thus, the jaw 52k rotates with the rotation of the bullets 322k1, 322k2.

Thus, in the illustrated embodiment, the axles 320 are fixed and the bullets 322 are rotatable, and in turn the jaws 52. In another embodiment, the bullets 322 are fixed to the main jaws 42 and the axles 320 are fixed to the pivoting jaws 52, thereby allowing the axles 320 to rotate and hence the jaws 52. Any combination of these embodiments, may also be used with efficacy, as needed or desired.

The hinge assembly 54a is substantially received in the grooves 84a, 284a and the hinge assembly 54k is substantially received in the grooves 84k, 284k. The jaw 52a is pivotably connected to the main jaw 42a by the hinge assembly 54a and the jaw 52k is pivotably connected to the main jaw 42k by the hinge assembly 54k. To facilitate operation, the hinge mechanisms 54 and the grooves 84, 284 may have a suitable lubricant applied thereon, for example, grease, oil, silicone, among others.

Referring in particular to FIGS. 4 and 27–31, the jaws 52 and the hinge mechanisms 54 are rotatable in directions generally indicated by arrows 370. Each also has a rotation axis 380 (380a, 380k).

The rotation axes 380a, 380k are generally coincident with a respective one of a longitudinal axis 390a, 390k of the respective pivot assemblies 54a, 54k. In the illustrated embodiment, the hinge mechanisms 54, the rotation axes 380 and the longitudinal axes 390 are generally perpendicular to the screw shaft 32 and its longitudinal axis 206.

The axles 320 are formed from a suitably strong and durable material. Preferably, the axles 320 comprise stainless steel. The axles 320 preferably have a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIGS. 27, the length $L_{271}$ is about 1.27 cm (0.500 inches), the length $L_{272}$ is about 6.99 cm (2.750 inches), the length $L_{273}$ is about 8.26 cm (3.250 inches) and the diameter $D_{271}$ is about 1.27 cm (½ inches). In other embodiments, other suitable dimensions may be utilized with efficacy, as needed or desired.

Still referring in particular to FIGS. 27, the pegs 326 have a length of about 1.88 cm (0.740 inches), a diameter $D_{272}$ of about 6.32 mm (0.249 inches), the holes 332 have a diameter formed by a 8-32 drill bit and the holes 330 have a diameter of about 1.00 cm (0.39 inches) and are formed by an about 82° countersink. In other embodiments, other suitable dimensions may be utilized with efficacy, as needed or desired.

The axles 320 can be fabricated by using a number of manufacturing techniques, for example, using steel stock. In one embodiment, the axles 320 are fabricated by utilizing machining operations. In other embodiments, the axles 320 may be fabricated by other methods, for example but not limited to casting, forging, molding, laser cutting and/or processing, laminating, adhesively fixing, welding, combinations thereof, among others, with efficacy, as needed or desired.

The bullets 322 are formed from a suitably strong and durable material. Preferably, the bullets 322 comprise stainless steel. The bullets 322 preferably have a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIG. 31, the bullet length $L_{311}$ is about 3.81 cm (1.5 inches), the length $L_{312}$ is about 2.54 cm (1.00 inches), the bullet outer diameter $D_{311}$ is about 1.27 cm (½ inches), the hole diameter $D_{312}$ is formed using a 8-32 drill bit/tap, the opening diameter $D_{313}$ is about 6.43 mm (0.253 inches) and the openings 338 have a depth of about 2.03 cm (0.800 inches). In other embodiments, other suitable dimensions may be utilized with efficacy, as needed or desired.

The bullets 322 can be fabricated by using a number of manufacturing techniques, for example, using steel stock. In one embodiment, the bullets 322 are fabricated by utilizing machining operations. In other embodiments, the bullets 322 may be fabricated by other methods, for example but not limited to casting, forging, molding, laser cutting and/or processing, laminating, adhesively fixing, welding, combinations thereof, among others, with efficacy, as needed or desired.

The screws 350, 360 are formed from a suitably strong and durable material. Preferably, the screws 350, 360 comprise stainless steel. The screws 350, 360 preferably have a black oxide finish to provide abrasion and corrosion resistance, among others, and which also results in a substantially black or dark gray color. In modified embodiments, other suitable alloys, metals, plastics, ceramics, combinations thereof, among others, with or without surface coatings or finishes, may be efficaciously utilized, as needed or desired.

Referring in particular to FIG. 3, the screws 350, 360 comprise 8-32 screws and have a length of about 1.91 cm (¾ inches). In other embodiments, other suitable dimensions may be utilized with efficacy, as needed or desired.

Visual Alignment System

Referring to the drawings, and in particular to FIG. 3, the three-dimensional visual alignment system generally comprises the width-wise extending indicia 82, 134, 282, the length-wise extending indicia 132 and the vertically extending indicia 136. Advantageously, the redundant three-dimensional system of arrayed indicia provides the user with the ability to accurately align the selected drill bit receiving hole 130 with the indexed location on the wood workpiece 20 where the dowel-receiving hole is to be drilled.

As illustrated in FIG. 3, a three-dimensional Cartesian system comprises three orthogonally oriented axes or dimensions. Namely, the X-axis or dimension, the Y-axis or dimension and the Z-axis or dimension. The indicia 82, 134, 282 extend in the X-axis or dimension, the indicia 132 extend in the Y-axis or dimension and the indicia 136 extend in the Z-axis or dimension.

The indicia 82, 132, 134, 136, 282 can be formed by a wide variety of techniques. For example, but not limited to, machining, laser processing, laser cutting, laser etching, chemical etching, applying paint, enamel or stickers, among others, as needed or desired.

In the illustrated embodiment, the indicia 82, 132, 134, 136, 282 are engraved. The indicia 82, 132, 134, 136, 282 comprise grooves to which white enamel is applied which provides clear visual differentiation on a darker background. 3-dimensional rows of the indicia are aligned with a corresponding one of the drill bit receiving holes 130. In modified embodiments, the indicia may be flat or comprise bumps or protrusions, as needed or desired.

Use and Operation

Referring to the drawings, and in particular to FIG. 4, in use, the doweling jig 10 is placed on the wood workpiece 20 so that the bushing plate lower surface 92 abuts against a top or upper surface 422 of the workpiece 20. The visual alignment system is used to align a selected one of the drill bit receiving holes 130 with marks on the workpiece upper surface 422 at which a dowel-receiving hole is to be drilled and/or marks on side surfaces 424 of the workpiece 20.

The screw shaft assembly 31 is operated by rotation of the knob 36 to cause the main jaws 42 and the attached pivoting jaws or clamping members 52 to move towards one another. Advantageously, the configuration of the screw shaft assembly 31 maintains the bushing plate centered relative to the moving jaws 42, 52.

The pivotable jaws 52a, 52k abut against a respective one of a pair of generally opposed side surfaces 424a, 424k of the workpiece 20. Further alignment may be performed, as needed. The knob 36 is tightened or tensioned further so that the jaws 52a, 52k firmly grip or clamp the side surfaces 424a, 424k and the clamping surfaces 260a, 260k are substantially flush with the workpiece side surfaces 424a, 424k.

Advantageously, the jaws 52 are pivotable about respective hinge mechanisms 54 to compensate for angular variations and irregularity in shape of the surfaces 424. Thus, the generation of an undesirable cantilever force due to skewed contact is substantially prevented or mitigated due to the substantially flush connection and the drill bit receiving holes 130 are aligned substantially perpendicularly to the workpiece upper surface 422. The redundant guide mechanism comprising the arrangement of four guide rods 150 advantageously further facilitates in preventing undesirable cantilever forces.

Once the doweling jig 10 and the workpiece 20 have been aligned, a drill bit 430 is used to create a dowel-receiving hole 440 in the workpiece 20. A plurality of holes in a plurality of workpieces may be created. In subsequent operations, dowels are inserted in the drilled holes and workpieces connected to form the desired product.

Advantageously, the doweling jig 10 can accommodate a wide range of widths of workpieces 20 within the jaws 52. Preferably, the jig 10 is operable to clamp workpiece widths in the range from about 0.635 cm (¼ inches) to about 6.03 cm (2-⅜ inches). Thus, in the maximum open position the jaws 52 are spaced by about 6.03 cm (2-⅜ inches). In other embodiments, smaller or larger widths of workpieces may efficaciously be accommodated, as needed or desired.

The doweling jig 10 can accommodate a wide range of sizes of drill bits 430. Preferably, the jig 10 can accommodate drill bit diameters in the range from about 0.48 cm (³⁄₁₆ inches) to about 1.91 cm (¾ inches). In other embodiments, smaller or larger drill bit sizes may efficaciously be accommodated, as needed or desired.

Figure 32:
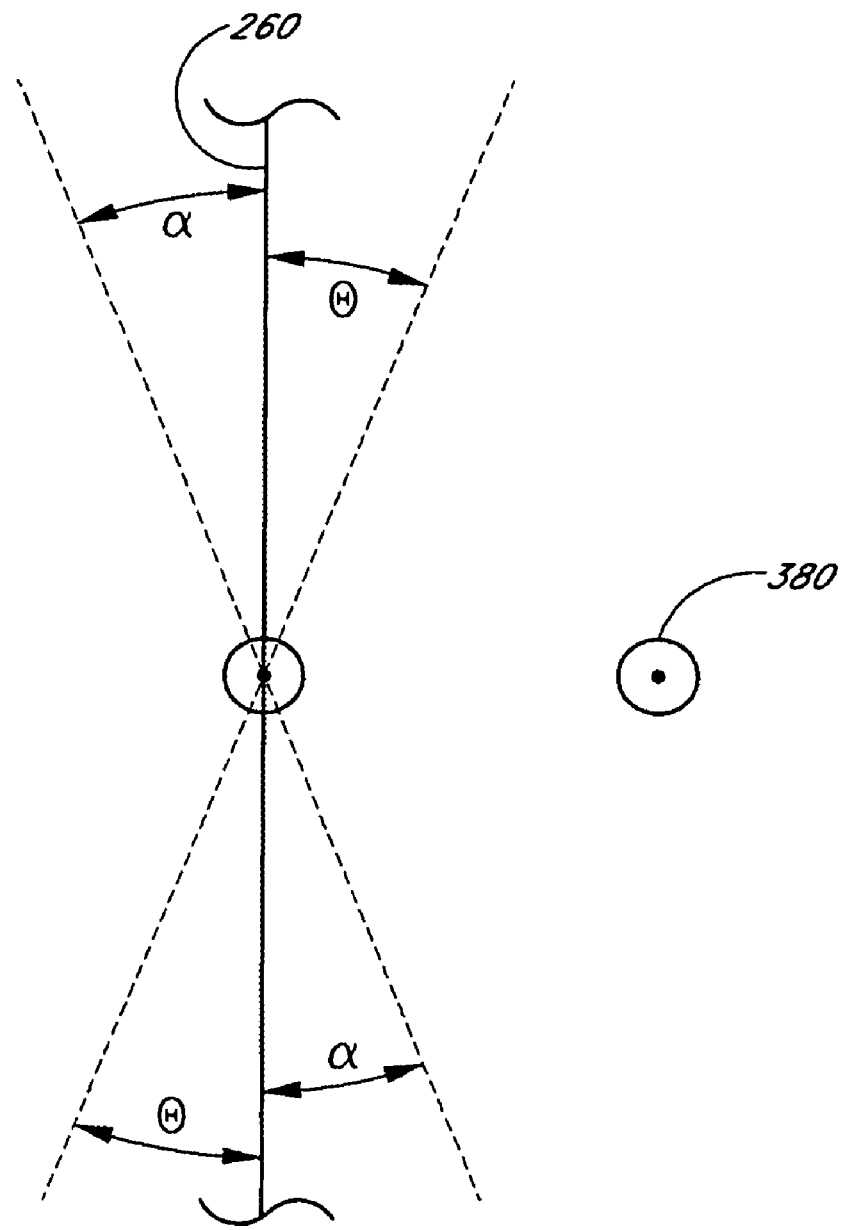
FIG. 32 is a simplified schematic illustration of the angular pivoting of the clamping surfaces of the doweling jig of FIG. 1 having features and advantages in accordance with embodiments of the invention.

FIG. 32 schematically depicts the rotation of the pivoting jaws or the clamping surfaces 260. The clamping surfaces 260 can tilt inwards or towards the workpiece surface by a maximum angle $\alpha$. The clamping surfaces 260 can tilt outwards or away from the workpiece surface by a maximum angle $\theta$.

Referring in particular to FIG. 32, in one embodiment, the angle $\alpha$ is about 10°. In another embodiment, the angle $\alpha$ is in the range from about 5° to about 15°, including all values and sub-ranges therebetween. In yet another embodiment, the angle $\alpha$ is in the range from about 2° to about 25°, including all values and sub-ranges therebetween. In modified embodiments, the angle $\alpha$ may be more or less, as needed or desired.

Still referring in particular to FIG. 32, in one embodiment, the angle $\theta$ is about 10°. In another embodiment, the angle $\theta$ is in the range from about 5° to about 15°, including all values and sub-ranges therebetween. In yet another embodiment, the angle $\theta$ is in the range from about 2° to about 25°, including all values and sub-ranges therebetween. In modified embodiments, the angle $\theta$ may be more or less, as needed or desired.

Certain Advantages

The doweling jig 10 of embodiments of the invention provides for accurate alignment and operation. Advantageously, the accuracy in positioning is about $5/1000^{th}$ of an inch or even better.

One advantage is that the pivoting jaws or clamping members 52 compensate for angular variations and irregularity in shape of the workpiece surfaces and grip the workpiece in a generally flush or smooth connection. Thus, the generation of an undesirable cantilever force due to skewed contact is substantially prevented or mitigated and the drill bit receiving holes 130 are accurately oriented and aligned. Advantageously, the sandblasted clamping surfaces 260 provide enhanced gripping capability. The hinged assemblies 54 provide load bearing substantially over their entire length span, thereby desirably providing enhanced clamping.

Another advantage is that the redundant guide mechanism comprising the double arrangement of the guide rods 150 permits controlled relative motion between the jaws 42, 52 and the bushing plate 34. The redundant guide mechanism comprising provides additional structural support and further facilitates in preventing undesirable cantilever forces.

Yet another advantage is provided by the self-centering mechanism of the screw shaft assembly 31. Desirably, the bushing plate 34 remains substantially centered between the jaws 42, 52. The screw shaft assembly 31 also provides for improved leverage which facilitates use. Advantageously, the ergonomic round knob 36 further facilitates operation of the doweling jig 10.

Still another advantage is provided by the three dimensional visual alignment system including the indicia or marks 82, 132, 134, 136, 282. The indicia extend in all three dimensions, that is, X, Y and Z. Advantageously, this facilitates the alignment between the jig 10 and the workpiece 20 and results in improved performance. The configuration of the jaw windows or viewing holes 74 desirably facilitate in viewing the indicia.

Advantageously, the top positioning and configuration of the drill bit size identification numbers 88 permit ease in identifying the desired drill bit receiving passage 130. The laser etching of the numbers 88 desirably provides greater visibility and durability.

Another advantage is provided by the thread inserts 160 which comprise a suitably strong material. Desirably, this substantially prevents or mitigates any gauling and seizure of the threads Yet another advantage is provided by the strong and durable materials used in the construction of embodiments of the doweling jig 10. The surface finish and coatings advantageously further enhance the overall utility.

The doweling jig 10 of embodiments of the invention is a versatile device. It can clamp to a wide range of widths of workpieces including large widths. In addition, it can accommodate a wide range of drill bit sizes including large sizes. It is modern and has an appealing appearance.

Other Embodiments

Figure 33:
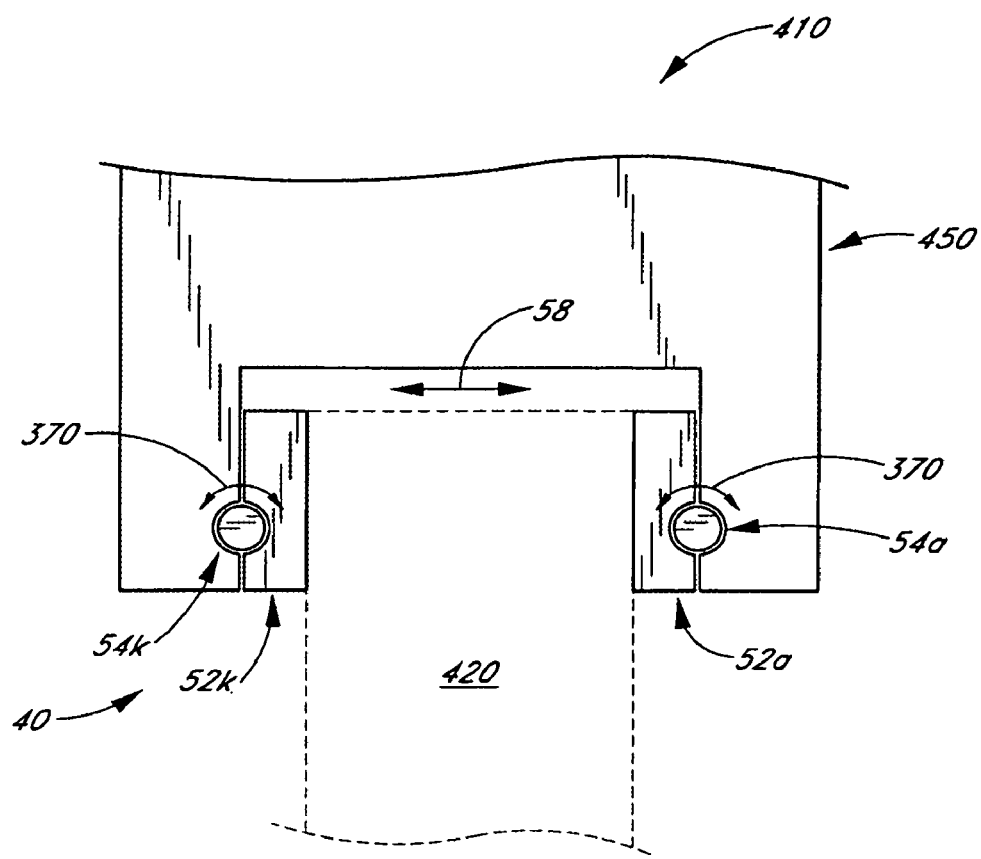
FIG. 33 is a simplified schematic illustration of a hinged jaw mechanism operatively coupled to a body portion having features and advantages in accordance with embodiments of the invention.

The hinged jaw mechanism 40 including the pivotable jaws 52a, 52k and the hinge assemblies 54a, 54k of embodiments of the invention can have a wide variety of applications and uses. FIG. 33 schematically illustrates a system 410 including the hinged jaw mechanism 40 operatively coupled to a main body portion 450 and clamped to a structure or support element 420.

Advantageously, substantially the entire length of the hinged assemblies 54 including the axles 320 and 322 provides load bearing for an enhanced clamping connection to the structure 420. The pivoting jaws 52 can uniformly load bear on any surface and compensate for angular variations and irregularity in shape of the structure 450. Thus, for example, substantially parallel or non-parallel surfaces may be gripped by the jaws 52.

Another advantage is that the hinged jaw mechanism or attachment device 40 may be used to non-permanently or detachably or removably connect the body portion 450 to the structure or support element 450. In some embodiments, the system 410 includes a self-centering mechanism.

A screw shaft assembly, as disclosed herein, may be used to move the jaws 52 in the directions 58 or other suitable means. For example, the jaws 52 may be moved by a spring-biased device or other suitable motion actuator which may be manual or electronic, as needed or desired.

The body portion 450 may comprise a holder such as a beverage holder, palm pilot holder and the like. The structure 420 may include any supporting surfaces, for example, in the interior of an automobile and the like. Thus, the system 410 may be detachably clamped to the interior of an automobile and removed, as needed or desired. The embodiments of FIG. 33 may comprise, but are not limited to, a suitable plastic material and the like.

The system 410 also has application in the medical field such as orthopedics and the like, for example, to align bones such as, but not limited to, the femur, among others. Another example of the use of the system 410 is in the field of metal working, for example, but not limited to, creating centered holes in channel steel and the like.

From the foregoing description, it will be appreciated that a novel approach for clamping mechanisms has been disclosed. While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the appended claims, including the full range of equivalency to which each element thereof is entitled.

What is claimed is:

1. A doweling jig for woodworking, comprising:
    a main body portion comprising a first jaw and a second jaw, said first jaw and said second jaw being spaced from one another to form a gap therebetween, said first jaw having a first length and said second jaw having a second length;
    a bushing member between said first jaw and said second jaw, said bushing member comprising a plurality of through holes sized and configured to receive drill bits of varying size;
    a first clamping surface extending substantially along said first length of said first jaw and being connected to said first jaw, said first clamping surface being substantially flat;
    a second clamping surface extending substantially along said second length of said second jaw and being connected to said second jaw, said second clamping surface being substantially flat;
    a first pivot mechanism operatively coupled to said first jaw and said first clamping surface to permit rotation of said first clamping surface relative to said first jaw, said first pivot mechanism extending substantially entirely alone said first length and said first pivot mechanism comprising a first axle connected to a pair of first side bullet members;
    a second pivot mechanism operatively coupled to said second jaw and said second clamping surface to permit rotation of said second clamping surface relative to said second jaw; and
    at least one of said clamping surfaces being movable towards and away from the other clamping surface to securely clamp a workpiece between said clamping surfaces and align said bushing member relative to said workpiece.

2. The doweling jig of claim 1, wherein said first axle is operatively fixed to said first jaw and said first side bullet members are operatively coupled to said first clamping surface and rotatable relative to said first axle to permit rotation of said first clamping surface relative to said first jaw.

3. The doweling jig of claim 2, wherein said second pivot mechanism extends substantially entirely along said second length.

4. The doweling jig of claim 3, wherein said second pivot mechanism comprises a second axle connected to a pair of second side bullet members.

5. The doweling jig of claim 4, wherein said second axle is operatively fixed to said second jaw and said second side bullet members are operatively coupled to said second clamping surface and rotatable relative to said second axle to permit rotation of said second clamping surface relative to said second jaw.

* * * * *

UNITED STATES PATENT AND TRADEMARK OFFICE
CERTIFICATE OF CORRECTION

PATENT NO.       : 7,147,412 B2                                  Page 1 of 1
APPLICATION NO.  : 10/458214
DATED            : December 12, 2006
INVENTOR(S)      : Robert L. Davis It is certified that error appears in the above-identified patent and that said Letters Patent is hereby corrected as shown below:

At column 26, line 36, please delete "alone" and insert --along--, therefor.

Signed and Sealed this

Twenty-sixth Day of June, 2007

JON W. DUDAS
*Director of the United States Patent and Trademark Office*